United States Patent
Sakaue et al.

(10) Patent No.: US 7,054,490 B2
(45) Date of Patent: May 30, 2006

(54) IMAGE PROCESSING APPARATUS AND IMAGE PROCESSING SYSTEM

(75) Inventors: Eiichi Sakaue, Tokyo-To (JP); Gaku Takano, Yokohama (JP)

(73) Assignees: Kabushiki Kaisha Toshiba, Kawasaki (JP); Toshiba Tec Kabushiki Kaisha, Tokyo-to (JP)

( * ) Notice: Subject to any disclaimer, the term of this patent is extended or adjusted under 35 U.S.C. 154(b) by 810 days.

(21) Appl. No.: 09/749,602

(22) Filed: Dec. 28, 2000

(65) Prior Publication Data

US 2002/0085217 A1 Jul. 4, 2002

(51) Int. Cl.
*H04N 1/46* (2006.01)
*G06K 9/00* (2006.01)

(52) U.S. Cl. ........................ 382/205; 382/225; 382/282; 358/500; 358/515

(58) Field of Classification Search ................ 358/448, 358/471, 479, 3.17, 1.9, 2.1, 515, 518; 382/205, 382/206, 225, 236, 254, 282, 167
See application file for complete search history.

(56) References Cited

U.S. PATENT DOCUMENTS 6,258,029 B1 * 7/2001 Guracar et al. ............. 600/443
2002/0085217 A1 * 7/2002 Sakaue et al. ............... 358/1.9

* cited by examiner

*Primary Examiner*—Jerome Grant, II
(74) *Attorney, Agent, or Firm*—Foley & Lardner LLP

(57) ABSTRACT

An image processing apparatus prepares dot cluster within block by pixel value shift to determine phase quantity every pixel value block at the time of constituting stripe pattern or texture of dots by set of dot clusters within respective blocks to control value of pixel shifted from respective pixels within block to shifted pixel designated within block in accordance with phase quantity thereof. Thus, it is possible to control position within block of dot cluster within corresponding block by level smaller than pixel size. In addition, an image processing system includes at least an image reading unit in addition to such an image processing apparatus and preferably comprises an image forming unit to thereby obtain high picture quality and stable image.

5 Claims, 21 Drawing Sheets

FIG. 14

| OPERATION NAME | PIXEL VALUE OF PIXEL TO BE PROCESSED | WRITE SHIFT BUFFER VALUE | CONDITION |
|---|---|---|---|
| THRU | 0 | P | |
| | Pf1+Pf2+P−xff×2 | xff×2−Pf1+Pf2 | Ph≧0 & Pf1+Pf2+P≧xff×2 |
| | P+Ph | Ph | Ph≧0 & Pf1+Pf2+P<xff×2 |
| | P+P1+P2 | −Ph−(Pf1+Pf2) | Ph<0 & Pf1+Pf2≧−Ph |
| TAKEF | xff | P+Pf+Pbuf−xff | Ph<0 & Pf1+Pf2<−Ph |
| | P+Pf+Pbuf | 0 | P+Pf+Pbuf≧xff |
| GIVEB | Pbuf | 0 | P+Pf+Pbuf<xff |

FIG. 17

| OPERATION NAME | PIXEL VALUE OF PIXEL TO BE PROCESSED | WRITE SHIFT BUFFER VALUE | CONDITION |
|---|---|---|---|
| THRU | P | 0 | |
| TAKEF | xff | P+Pf−xff | Ph≧0 & Pf1+Pf2+P≧xff×2 |
| | P+Pf | 0 | P+Pf≧xff |
| GIVEB | Pbuf | 0 | P+Pf<xff |

IMAGE PROCESSING APPARATUS AND IMAGE PROCESSING SYSTEM

BACKGROUND OF THE INVENTION

This invention relates to an image processing apparatus and an image processing system adapted for shifting pixel value between pixels to constitute image texture.

In recent years, there have been popularized printers, digital copy machines, facsimiles and the like as image processing apparatuses and/or systems adapted for reading a picture image of a color manuscript by image input means, e.g., a color scanner, etc. to input such image to copy this image, or to carry out a predetermined image processing such as picture quality adjustment, image transform processing or editing processing, etc. with respect to such input image thereafter to provide hard copy output of that image onto paper by image output means such as a color printer of the electric photographic system, etc.

In such image processing apparatuses, quality and stability of image to be copied or duplicated are important, and gradation representation is required for the purpose of representing a photograph, etc. In order to carry out such gradation representation, various systems such as dither system, etc. have been developed. In the field of the hard copies, stripe pattern systems have been widely used.

A stripe pattern system is the system of representing, as shown in FIG. 19, ink (black) portions 160 distributed in units of pixels 150 in ordinary natural image by texture consisting of sets of longitudinal lines periodically arranged in a column manner in which such ink portions 160 are collected at the same main scanning position, wherein gradations are represented by widths of respective longitudinal lines. In this stripe pattern system, since ink portions of respective pixels are continuous in the longitudinal direction, frequency of ink (dot) modulation pattern is low so that resolution is lowered, whereas stable recording is advantageously carried out.

The example where modulation frequency in the stripe pattern system is further lowered is shown in FIG. 20. In this case, ink portions 160 existing in the main scanning direction are moved between pixels 150 so that dots are connected. In this example, with three pixels being as unit, left and right ink portions are concentrated in the state where central pixel is caused to be center. The method of FIG. 20 is more popular than the method of FIG. 19. This also results from the fact that width per one dot is 42 μm at 600 dpi from the requirement of realization of high picture quality, whereas laser beam diameter is about 70 μm, so processing of one pixel unit is actually impossible.

As shown in FIG. 21, as a method of generating stripe pattern, there is popular a method of generating reference signal 210 having periodical property like triangular wave, obtaining the relationship in magnitude between the reference signal 210 and pixel value 220 in the form of electric signal by means of a comparator in analog manner, then attaching ink only onto the portions of larger pixel value. In the case of a laser printer, since ink attached region is substantially equal to the laser light emitted region, the above-mentioned method can be realized by preparing circuit in which laser is light-emitted when value obtained by subtracting reference signal value from pixel value is positive.

On the other hand, in the case of carrying out color recording, color recording is conducted in the state where plates (printing blocks) of four colors of CMYK having such stripe pattern structure are overlapped. When stripe patterns of respective plates are exactly the same, interference takes place between stripe patterns so that Moire fringes occur. In order to prevent such interference, it is effective to employ a method of varying, every plates, angle or phase of stripe pattern to allow frequency of the interference fringes to be unnoticeable high frequency.

The method shown in FIGS. 22A and 22B is proposed in the Japanese Patent Application Laid Open No. 230163/1987 as an example of such a method, wherein phases of reference signal 210 of the first line shown in FIG. 22A and reference signal 230 of the second line shown in FIG. 22B are shifted every line.

However, such a method requires a complicated and large scale circuit for the purpose of generating periodical analog reference signal.

Furthermore, at the time of preparing stripe patterns of different angles for every plates of respective colors in color recording, plural periodical electric signals having various phases corresponding to angles must be prepared, so the circuit scale is further enlarged.

Furthermore, since such periodical electric signal is analog signal, anti-noise tolerance is weak (low). In the case of color recording, it is also difficult to adjust, with good accuracy, phase differences between plural periodical electric signals, resulting in the problem that smooth stripe pattern having angle cannot be generated. In addition, in dependency upon picture signal, there take place gaps 240 between stripe patterns as shown in FIG. 23, and dot modulation frequency in the main scanning direction is caused to be rather high. Thus, stable recording cannot be disadvantageously carried out.

In order to eliminate the drawbacks of the above-described analog circuit, it has become possible to carry out the above-described processing by digital circuit by using the digital circuit technologies which have been developed in recent years. Namely, there is a method in which, in place of analog reference signals, the portion within pixel is finely divided by high frequency clock to obtain, in a pseudo manner, then reference signals by means of counter circuit to compare them with picture signals. As compared to the analog system, this method is tolerable to electric noise, and permits the circuit scale to be compact. However, even if such a method is employed, in the case of image as shown in FIG. 23, it is not inevitable that gaps 240 take place.

As a method of solving gap of such picture signal, there has been proposed a technology in which picture image is divided into blocks 310 as shown in FIG. 24 to shift pixel 150 to shifted pixel 320 in accordance with pixel position within the block 310 to form cluster of dots within the blocks to connect clusters of dots of the respective blocks to generate stripe pattern (Japanese Patent Application Laid Open No. 41473/1999). With this method, however, since pixel is shifted only by information of pixel position irrespective of pixel value, phase ph can be controlled only in one pixel units as shown in FIG. 25. As a result, there is the problem that it is impossible to freely generate arbitrary screen angle.

Moreover, when attempt is made to represent or express, by stripe pattern, low density portion in which ratio of pixels where dots exist is low as shown in FIG. 26, i.e., highlight portion, width W of the stripe pattern becomes extremely small. As a result, density becomes unstable in the image recording characteristic, giving rise to rough feeling.

In view of the above, there is also devised a technology in which, with respect to the highlight portion, as shown in FIG. 27, blocks of units larger than block unit constituting the stripe pattern are constituted from plural pixels existing in the main scanning direction to collect pixel values within respective blocks into one shifted pixel 330 to prepare cluster of dots, and to shift that dot cluster position every line to thereby carry out recording by pattern like dot (Japanese Patent Application Laid Open No. 205603/1999). With this method, however, since dots are collected at one portion, dots can be formed only at the central portions of pixels. As a result, the degree of freedom of phase of dots within pixels in the main scanning direction is low. Therefore, there is no problem in the case of screen angle 340 in which gradient is 1/N (N=3 in FIG. 27) as shown in FIG. 27. However, in the case of screen angle 350 except for 1/N such that screen angle gradient is 3/6 as shown in FIG. 28, intervals of dots become thin, giving feeling of noise to an observer.

As described above, in the technologies which are known at present, e.g., in the method of generating recording device drive pulse by comparison between periodical electric signal and pixel data to carry out recording of the stripe pattern structure, gaps are formed between stripe patterns, and dot pattern is caused to have high frequency, resulting in the problem that recording becomes unstable. Further, in the analog circuit, there is the problem that noise is large. On the other hand, also in the method by shift image, there is the problem that it is impossible to take arbitrary screen angle with respect to stripe pattern.

In addition, in the method of periodically collecting pixels at one pixel to form dots to record highlight portion, there was the problem that dot pattern having arbitrary gradient cannot be spatially uniformly generated, giving rise to noise.

SUMMARY OF THE INVENTION

A first object of this invention is to provide an image processing apparatus in which dot pattern is permitted to have low frequency so that stable gradation image can be obtained.

Further, a second object of this invention is to provide an image processing system including an image processing unit capable of obtaining stable gradation image.

In accordance with the first aspect of this invention, there is provided an image processing apparatus having:

an intrablock pixel position judging section for judging pixel position within a block in which pixels constituting image are divided in units of plural pixels;

a shifted pixel designating section for designating shifted pixel to be shifted in accordance with the pixel position judged by the intrablock pixel position judging section;

a phase calculating section for determining phase quantity of intrablock dot cluster for every block; and a pixel value shift section for carrying out shift from respective pixels within the block to the shifted pixel on the basis of the phase quantity determined by the phase calculating section and, value differences of respective pixels within the block and value of the shifted pixel.

In the image processing apparatus according to this invention, there is employed such an approach to determine phase quantities every pixel value blocks to control, in dependency upon the phase quantities, values of pixels shifted to plural shifted pixels designated within block from respective pixels within blocks to carry out pixel value shift to prepare dot clusters within the blocks to constitute stripe pattern or texture of dots by sets thereof. Accordingly, it is possible to control position of dot cluster within the block by level smaller than pixel size. Thus, picture quality and stability can be improved.

In addition, in accordance with the second aspect of this invention, there is provided an image processing system having:

an image reading unit for reading image on manuscript; and an image processing unit for processing the image which has been read at the image reading unit to output processed data, wherein the image processing unit comprises:

an intrablock pixel position judging section for judging pixel position within a block in which pixels constituting image are divided in units of plural pixels;

a shifted pixel designating section for designating shifted pixel to be shifted in accordance with the pixel position judged by the intrablock pixel position judging section;

a phase calculating section for determining phase quantity of intrablock dot cluster for every block; and a pixel value shift section for carrying out shift from respective pixels within the block to the shifted pixel on the basis of the phase quantity determined by the phase calculating section, and value differences of respective pixels within the block and value of the shifted pixel.

In accordance with this image processing system, it is possible to provide printer, copy machine and facsimile, etc. capable of obtaining image of high picture quality and high stability.

BRIEF DESCRIPTION OF THE DRAWINGS

In the accompanying drawings:

FIG. 14 is a table collectively showing pixel shift operation of operation circuit used in this invention;

FIG. 17 is a Table collectively showing conventional pixel shift operation;

DESCRIPTION OF THE PREFERRED EMBODIMENTS

Preferred embodiments of this invention will now be described with reference to the attached drawings.

Figure 1:
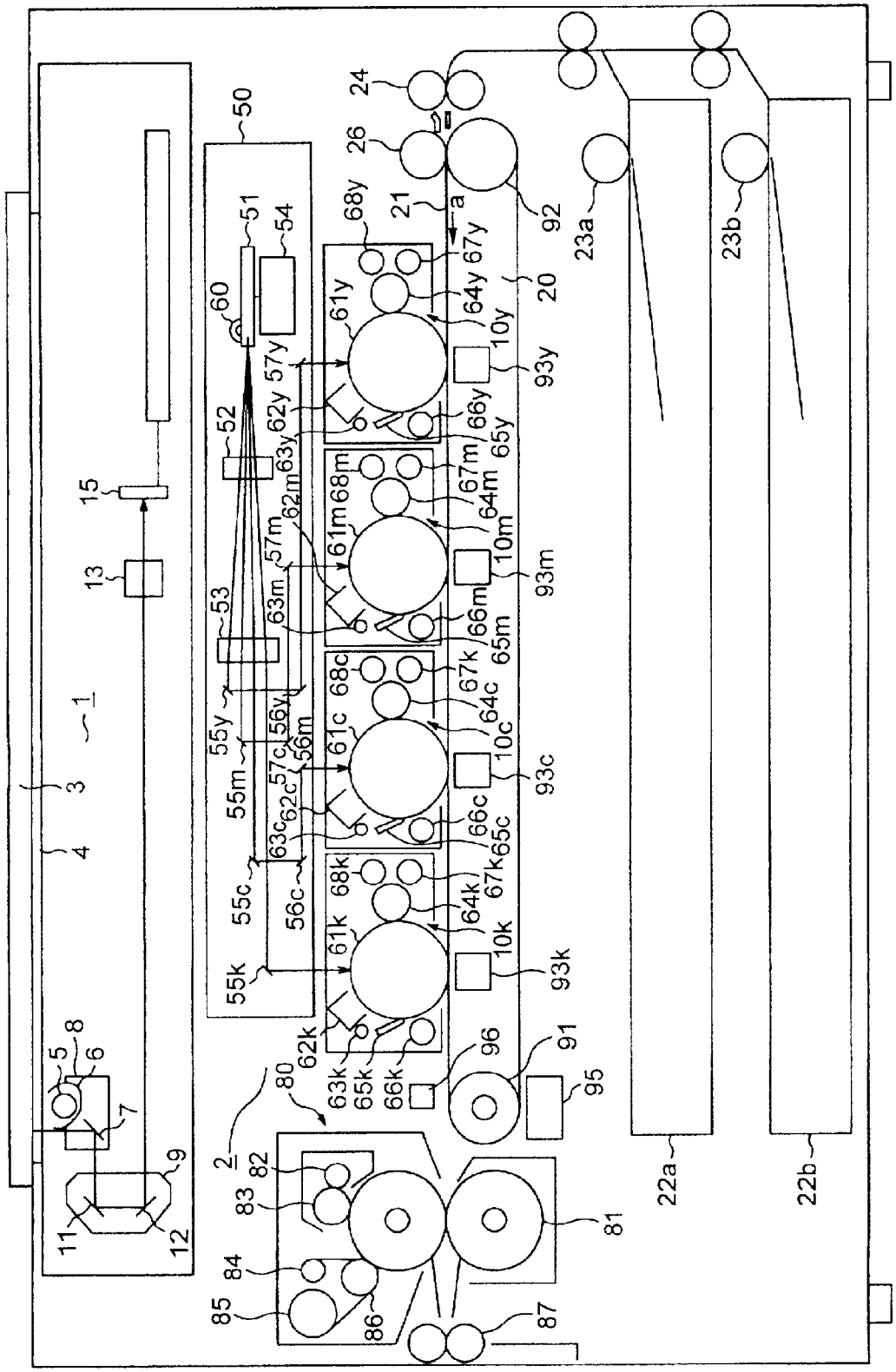
FIG. 1 is a view schematically showing the internal configuration of an image processing system according to this invention.

FIG. 1 is a view schematically showing the configuration of internal mechanism of an image processing apparatus such as a digital system color copy machine, etc. according to the embodiment of this invention. This image processing apparatus serves to read a color image on a manuscript to form a copy image thereof, and includes, when roughly viewed, a color scanner unit 1 as image reading means for reading color image on the manuscript to input it, and a color printer unit 2 as image forming means for forming duplicated copy image of the inputted color image.

The color scanner unit 1 includes a manuscript cover 3 at its upper portion, and includes a platen 4 disposed oppositely to the manuscript cover 3 in the closed state and comprised of transparent glass on which manuscript is set. At the lower portion of the platen 4, there are arranged an exposure lamp 5 for illuminating manuscript mounted on the platen 4, a reflector 6 for converging light from the exposure lamp 5 onto the manuscript, a first mirror 7 for bending reflected light from the manuscript in a left direction with respect to the drawing, and the like. The exposure lamp 5, the reflector 6 and the first mirror 7 are fixed on a first carriage 8. The first carriage 8 is driven by a pulse motor (not shown) through a toothed belt (not shown), etc. so that it is moved in parallel to the lower surface of the platen 4.

At the left side in the figure with respect to the first carriage 8, i.e., in the direction where light reflected by the first mirror 7 is guided, there is disposed a second carriage 9 movably provided in parallel to the surface of the platen 4 through a drive mechanism (not shown) composed of, e.g., a toothed belt and a dc. motor, etc. At the second carriage 9, a second mirror 11 for bending, in lower direction in the figure, reflected light from manuscript guided by the first mirror 7 and a third mirror 12 for bending, in the right direction in the figure, reflected light from the second mirror 11 are disposed in such a manner that they are perpendicular to each other. The second carriage 9 is followed by the first carriage 8, and is moved in parallel to the surface of the platen 4 at the half speed of the first carriage 8.

Within the plane including optical axis of light bent by the second and third mirrors 11, 12, there is disposed an image-formation lens 13 for image-forming reflected light from the third mirror 12 at a predetermined magnification. Within the plane substantially perpendicular to the optical axis of light passed through the image-formation lens 13, there is disposed a CCD type color image sensor (photo-electric conversion element) for converting reflected light to which convergence is given by the image-formation lens 13 into an electric signal.

When such a configuration is used to converge light from the exposure lamp 5 onto manuscript on the platen 4 by the reflector 6, reflected light from the manuscript is incident to the color image sensor 15 through the first mirror 7, the second mirror 11, the third mirror 12 and the image-formation lens 13, at which incident light is converted into electric signals corresponding to three primary colors of light of red (R), green (G) and blue (B).

On the other hand, the color printer unit 2 includes first to fourth image formation sections 10y, 10m, 10c, 10k for respectively forming images color-separated every respective color components, i.e., images of four colors of yellow (y), magenta (m), cyan (c) and black (k) on the basis of well known subtractive color mixing method.

At the lower portion of the respective image formation sections 10y, 10m, 10c, 10k, there is disposed a carrying mechanism 20 including a conveyor belt 21 as carrying means for carrying, in the direction indicated by arrow a in the figure, images every respective colors formed by the respective image formation sections. The conveyor belt 21 is wound across a drive roller 91 rotated in the direction indicated by arrow a by motor (not shown) and a driven roller 92 spaced by a predetermined distance from the drive roller 91 so that it is stretched, and is caused to undergo endless travelling at a fixed speed (velocity) in the direction indicated by a. In this example, the respective image formation sections 10y, 10m, 10c, 10k are disposed linearly along the carrying direction of the conveyor belt 21.

The respective image formation sections 10y, 10m, 10c, 10k respectively include photosensitive drums s 61y, 61m, 61c, 61k as image carrying bodies of which outer circumferential surfaces can be rotated in the same direction at positions in contact with the conveyor belt 21. The respective photosensitive drums s 61y, 61m, 61c, 61k are adapted so that they are rotated at a predetermined circumferential speed (velocity) by motor (not shown).

The respective photosensitive drums s 61y, 61m, 61c, 61k are disposed so that their axes are provided equidistantly to each other, and are disposed so that their axes are perpendicular to the direction in which images are carried by the conveyor belt 21. It is to be noted that, in the following description, axial direction of the respective photosensitive drums s 61y, 61m, 61c, 61k is caused to be main scanning direction (second direction) and rotational direction of photosensitive drums s 61y, 61m, 61c, 61k, i.e., rotational direction (direction indicated by arrow a in the figure) of the conveyor belt 21 is caused to be sub scanning direction (first direction).

At the periphery of the respective photosensitive drums s 61y, 61m, 61c, 61k, charging units 62y, 62m, 62c, 62k as charging means extended in the main scanning direction, charge remover units 63y, 63m, 63c, 63k, development rollers 64y, 64m, 64c, 64k as development means similarly extended in the main scanning direction, lower agitation rollers 67y, 67m, 67c, 67k, upper agitation rollers 68y, 68m, 68c, 68k, transfer units 93y, 93m, 93c, 93k as transfer means similarly extended in the main scanning direction, cleaning blades 65y, 65m, 65c, 65k similarly extended in the main scanning direction, and waste toner recovery screws 66y, 66m, 66c, 66k are respectively disposed in order along the rotational direction of the photosensitive drums s 61y, 61m, 61c, 61k.

In this example, the respective transfer units 93y, 93m, 93c, 93k are disposed at the position where they put the conveyor belt 21 between the respective transfer units and corresponding photosensitive drums s 61y, 61m, 61c, 61k, i.e., at the inside of the conveyor belt 21. In addition, exposure points by exposure unit 50 which will be described later are respectively formed on outer circumferential surfaces of the photosensitive drums s 61y, 61m, 61c, 61k between the charging units 62y, 62m, 62c, 62k and the development rollers 64y, 64m, 64c, 64k.

At the lower portion of the carrying mechanism 20, there are disposed paper cassettes 22a, 22b for accommodating plural papers P as image formed medium (recording medium) for transferring images formed by the respective image formation sections 10y, 10m, 10c, 10k.

At one end portions of the paper cassettes 22a, 22b and at the side close to the driven roller 92, there are respectively disposed pick-up rollers 23a, 23b for taking out, one by one, papers P accommodated within the paper cassettes 22a, 22b from the uppermost portion thereof. Between the pick-up rollers 23a, 23b, and the driven roller 92, there is disposed a resist roller 24 for carrying out adjustment between the leading end of paper P taken out from the paper cassette 22a or 22b and the leading end of tonner image formed on the photosensitive drums 61y of the image formation section 10y.

In this example, toner images formed on other photosensitive drums s 61y, 61m, 61c are delivered to respective transfer positions in a manner in correspondence with conveying timing of paper P carried on the conveyor belt 21.

At the portion between the resist roller 24 and the first image formation section 10y and in the vicinity of the driven roller 92, i.e., on the outer circumference of the driven roller 92 in the state where the conveyor belt 21 is substantially put therebetween, there is disposed an absorption roller 26 for giving electrostatic absorption force to papers P carried at a predetermined timing through the resist roller 24. In this example, setting is made such that axis of the absorption roller 26 and axis of the driven roller 92 are in parallel to each other.

At one end of the conveyor belt 21 and in the vicinity of the drive roller 91, i.e., on the outer circumference of the drive roller 91 in the state where the conveyor belt 21 is substantially put therebetween, there is disposed a positional shift sensor 96 for detecting position of image formed on the conveyor belt 21. The positional shift sensor 96 is comprised of, e.g., transmission type or reflection type optical sensor.

On the outer circumference of the drive roller 91 and on the conveyor belt 21 of the down-stream side of the positional shift sensor 96, there is disposed a conveyor belt cleaning unit 95 for removing toner or paper refuse of paper P, etc. attached on the conveyor belt 21.

In the direction where paper P carried through the conveyor belt 21 is taken off from the drive roller 91 and is further carried, there is disposed a fixing unit 80 for fusing toner transferred onto the paper P by heading the paper P so that it has a predetermined temperature to fix toner image onto the paper P. The fixing unit 80 is composed of a heat roller pair 81, oil coating rollers 82, 83, a web winding roller 84, a web roller 85 and a web pressing roller 86. Toner formed on the paper P is fixed on the paper, and the paper is ejected by an eject paper roller pair 87.

The exposure unit 50 for forming electrostatic latent images respectively color-separated on the outer circumferences of the respective photosensitive drums s 61y, 61m, 61c, 61k includes a semiconductor laser oscillator 60 caused to undergo light-emitting control on the basis of image data (Y, M, C, K) every respective colors which are color-separated at image processing section 36 which will be described later. On the optical path of the semiconductor laser oscillator 60, there are provided in order a polygon mirror 51 rotated by a polygon motor 54, which reflects and scans laser beams, and fθ lenses 52, 53 for correcting focal point of laser beams reflected through the polygon mirror 51 to form image thereof.

Between the fθ lens 53 and the respective photosensitive drums s 61y, 61m, 61c, 61k, there are disposed first bending mirrors 55y, 55m, 55c, 55k for bending laser beams every respective colors passed through the fθ lens 53 toward exposure positions of the respective photosensitive drums s 61y, 61m, 61c, 61k, and second and third bending mirrors 56y, 56m, 56c, 57y, 57m, 57c for further bending laser beams bent by the first bending mirrors 55y, 55m, 55c.

In this example, laser beams for black are bent by the first bending mirror 55k, and are then guided onto the photosensitive drums 61k without routing other mirrors.

Figure 2:
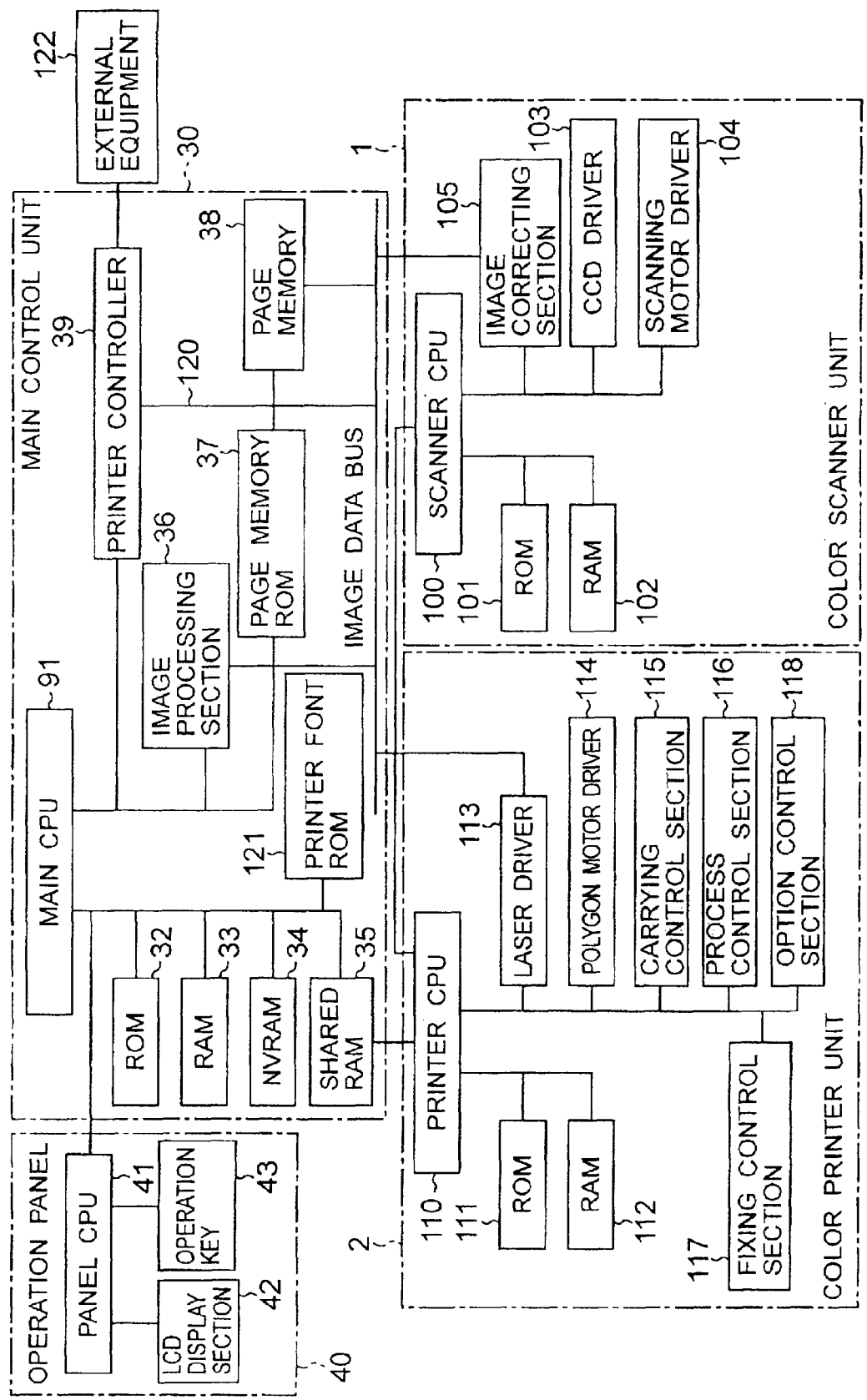
FIG. 2 is a block diagram showing electrical connection and control system of image processing unit shown in FIG. 1.

FIG. 2 is a block diagram schematically showing electric connection and flow of signals for control of the image processing apparatus shown in FIG. 1. In FIG. 2, the control system is constituted by three CPUs of a main CPU (Central Processing Unit) 91 within a main control unit 30, a scanner CPU 100 of the color scanner unit 1 and a printer CPU 110 of the color printer unit 2.

The main CPU 91 serves to carry out bidirectional communication through the printer CPU 110 and a shared RAM (Random Access Memory) 35. The main CPU 91 outputs operation designation and the printer CPU 110 outputs status as response.

A control panel 40 is a panel for giving command to the main control unit 30, and includes a liquid crystal display section 42, various operation keys 43 and a panel CPU 41 to which such components are connected, wherein this panel CPU 41 is connected to the main CPU 91.

The main control unit 30 is constituted by the main CPU 91 for governing the entire control, a ROM 32 for storing control program, etc., a RAM 33 for temporarily storing data, a NVRAM (Non Volatile RAM) 34 which is non-volatile memory backed up by battery (not shown) for the purpose of holding storage data even if power is interrupted (turned OFF), the shared RAM 35 used for carrying out bidirectional communication between the main CPU 91 and the printer CPU 110, image processing section 36, a page memory control section 37, a page memory 38, a printer controller 39, and a printer font ROM 121.

The image processing section 36 will be described later.

The page memory control section 37 stores image information with respect to the page memory 38 or reads out such information therefrom. The page memory 38 has an area in which image information corresponding to plural pages can be stored, and can store, every page, data obtained by compressing image information from the color scanner unit 1.

In the printer font ROM 121, font data corresponding to print data are stored.

The printer controller 39 serves to expand (develop) print data from an external equipment 122 such as personal computer, etc. into image data by using font data stored in the printer font ROM 121 at resolution corresponding to data indicating resolution given to that print data.

The color scanner unit 1 is constituted by the scanner CPU 100 for governing the entire control, a ROM 101 for storing control program, etc., a RAM 102 for data storage, a CCD driver 103 for driving the color image sensor 15 shown in FIG. 1, a scanning motor driver 104 for controlling rotation of the scanning motor which moves the first carriage 8, etc., and an image correcting section 105, etc.

The image correcting section 105 is constituted by A/D converting circuits for respectively converting analog signals of R, G, B outputted from the color image sensor 15 into digital signals, shading correction circuit for correcting change of threshold level with respect to output signal from the color image sensor resulting from unevenness of the color image sensor or ambient temperature change, etc., and line memory for temporarily storing shading-corrected digital signal from the shading correction circuit, etc.

The color printer unit 2 is constituted by the printer CPU 110 for governing the entire control, a ROM 111 for storing control program, etc., a RAM 112 for data storage, a laser driver 113 for driving semiconductor laser oscillator 60, a polygon motor driver 114 for driving the polygon motor 54 of the exposure unit 50, a carrying control section 115 for controlling carrying (transfer) of paper P by the carrying mechanism 20, a process control section 116 for controlling process which carries out electrification (charging), development and transfer by using an electrification unit, development roller and transfer unit, a fixing control section 117 for controlling fixing unit 80, and an option control section 118 for controlling option, etc.

In this example, the image processing section 36, the page memory 38, the printer controller 39, the image correcting section 105 and the laser driver 113 are connected by image data bus 120.

Figure 3:
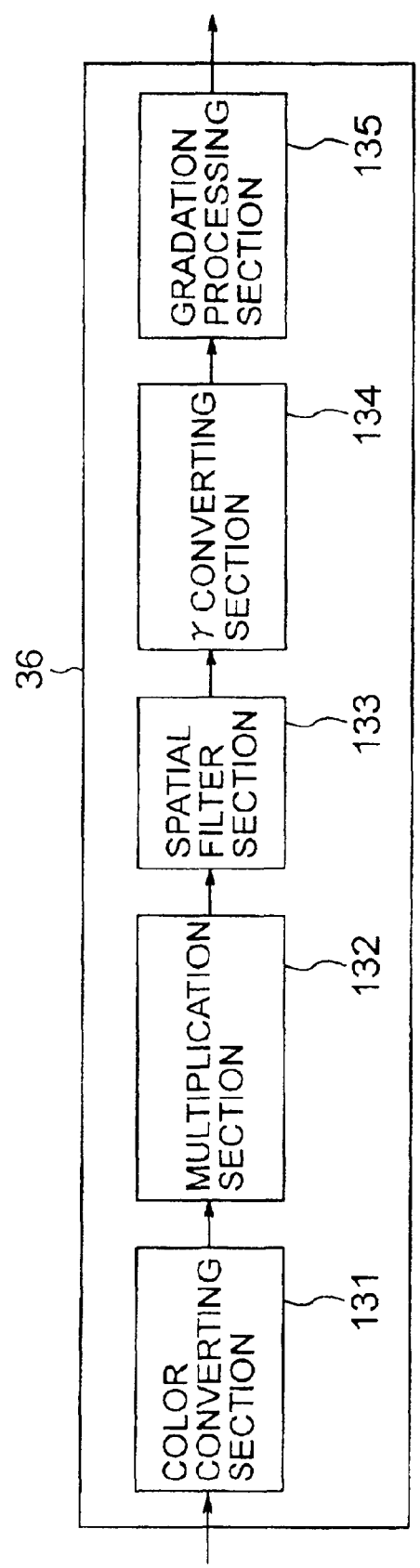
FIG. 3 is a block diagram showing the main configuration of image processing section in FIG. 2.

The image processing section 36 which forms the essential part of this invention will now be described in detail. FIG. 3 is a block diagram showing the main function of the image processing section. The image processing section 36 illustrated here is constituted by a color converting section 131, a multiplication section 132, a spatial filter section 133, a γ converting section 134 and a gradation processing section 135, which respectively carry out color conversion, multiplication, spatial filter, γ conversion and gradation processing to thereby obtain image data of C, M, Y.

Namely, respective image data R, G, B outputted from the color scanner unit 1 are sent to the color converting section 131, at which they are converted into image data of C, M, Y. Image data outputted from the color converting section 131 is caused to undergo multiplication processing at the multiplication section 132. The image data thus processed is caused to undergo spatial filter processing at the spatial filter section 133. The image data thus processed is caused to undergo γ-conversion processing at the γ-correcting section 134. The image thus processed is caused to undergo gradation processing which is intermediate gradation processing at the gradation processing section 135. The image data thus obtained is sent to the color printer unit 2.

In this case, correction of γ-characteristic of the printer is carried out at the γ correcting section 134. This correction is carried out by making reference to γ-Table set every C, M, Y, K.

Moreover, the gradation processing section 135 carries out gradation processing with respect to image signal so that the image signal is converted into recording device drive signal. Quantization or image density conversion caused to be in correspondence with characteristic of recording device is carried out with respect to input signal that recording device requires in order that gradation is not injured.

The recording device drive signal is laser drive pulse signal in the case of printer of the pulse width modulation system, and includes information of length and reference position of drive pulse for driving the printer laser modulation section. The reference position indicates whether portion to be driven is left end within pixel, right end therewithin or middle portion therewithin. It is to be noted that while recording device drive signal in the case of printer of the power modulation system is also laser drive pulse signal, the pulse width is always constant in this case, and energy intensity of pulse forms density gradation.

In the printer unit 2, recording image is formed in accordance with recording device drive signal. In the case where the printer unit 2 employs the pulse width modulation system, recording device drive signal is drive pulse signal, and ON/OFF of laser beams is carried out in accordance with drive pulse.

Figure 4:
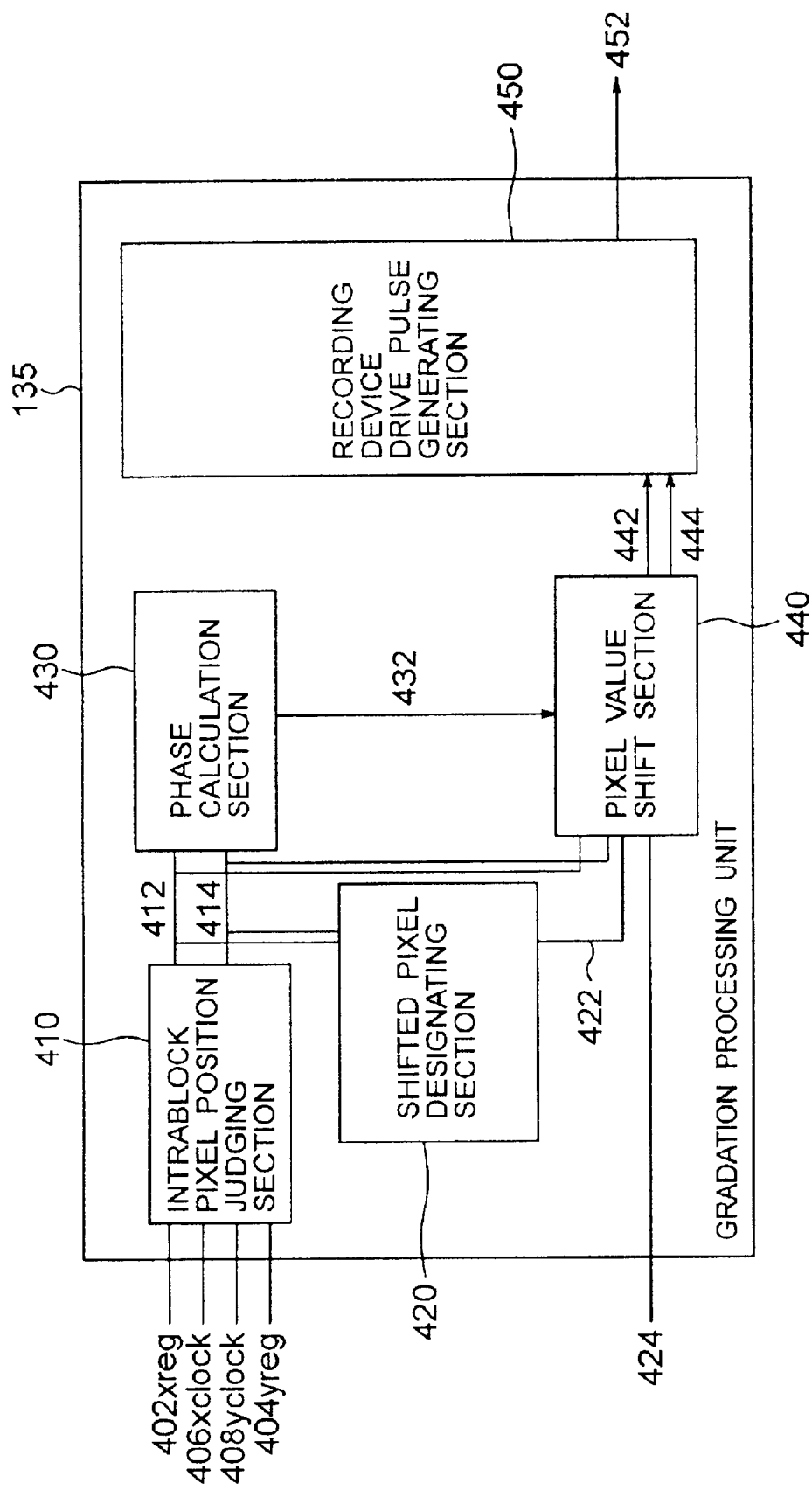
FIG. 4 is a block diagram showing the main configuration of gradation processing section in FIG. 3.

FIG. 4 is a block diagram showing the configuration of the gradation processing section 135.

This gradation processing section 135 includes an intrablock pixel position judging section 410, a shifted pixel designating section 420, a phase calculating section 430, a pixel value shift section 440, and a recording device drive pulse generating section 450. Respective components will be described below in order.

The intrablock pixel position judging section 410 receives register set value xreg 402 and yreg 404, clock signal xclock 406 in the main scanning direction, and clock signal yclock 408 in the sub scanning direction which are delivered from clock generating section (not shown) to calculate pixel positions of signals being processed to generate intrablock main scanning (x) direction coordinate 412 and intrablock sub scanning (y) direction coordiante 414.

The shifted pixel designating section 420 detects shifted pixel within the block from the intrablock main scanning direction coordinate 412 and intrablock sub scanning direction coordinate 414 to generate a shift pixel designation signal 422.

The phase calcualting section 430 generates phase quantity 432 indicating magnitude of dot cluster shift phase within each block from the intrablock main scanning direction coordinate 412 and the intrablock sub scanning direction coordinate 414.

The pixel value shift section 440 inputs intrablock main scanning direction coordinate 412, intrablock sub scanning direction coordinate 414, shift pixel designation signal 422, phase quantity 432 and processing pixel input value data 424 to calculate output value 442 of shifted pixel to be processed and reference position signal 444. It is to be noted that in the case where the preceding stage is γ converting section, processing pixel input value data 424 is data after undergone passing through quantizing section (not shown).

The recording device drive pulse generating section 450 generates recording device drive pulse 452 from output value 442 of pixel to be processed and reference position signal 444. The recording device drive pulse 452 is signal for driving the recording device for a time period during which corresponding pulses are outputted, and is laser drive signal when considered by the laser recording electronic photographic system.

Explanation will be given below on the assumption that recording device drive signal 452 is laser drive pulse signal unless pointed out specifically in this embodiment.

Figures 5A, 5B:
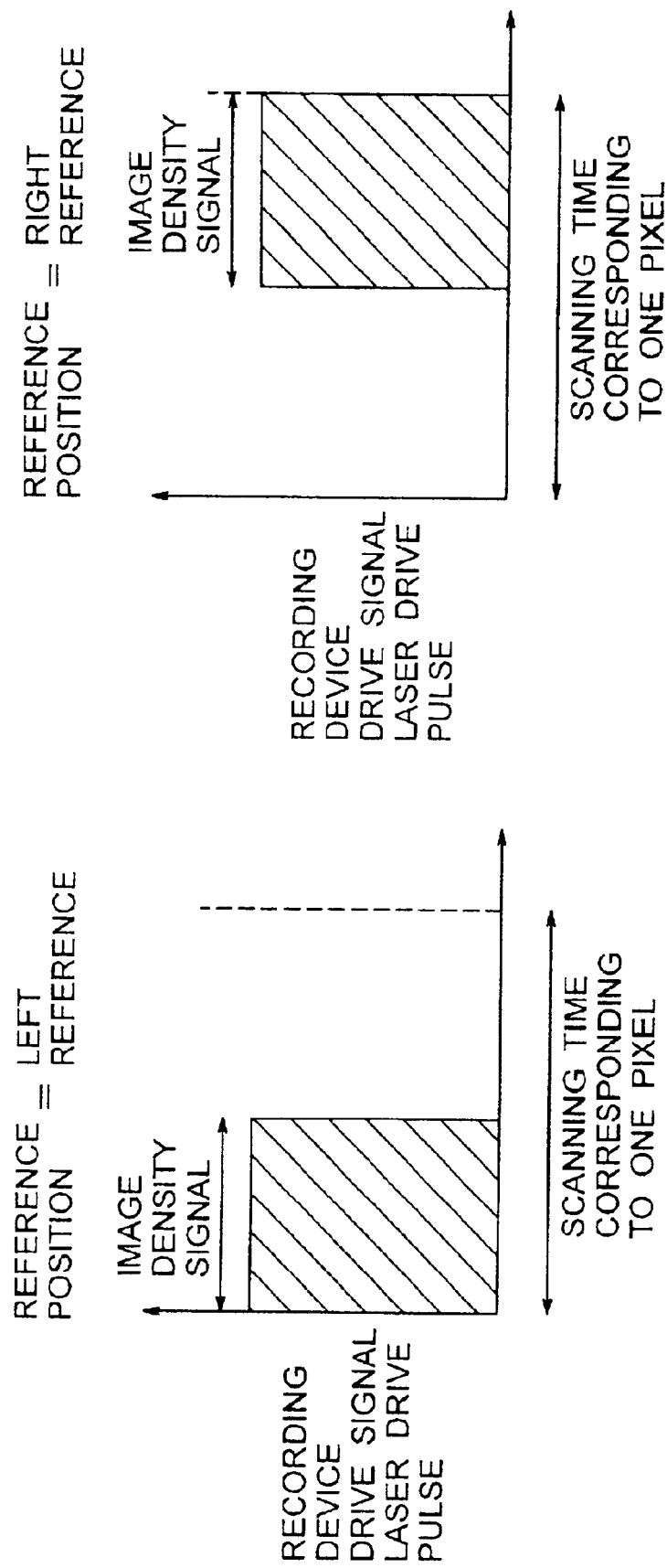
FIGS. 5A and 5B are explanatory views showing the relationship between image density signal and scanning time corresponding to one pixel.

FIGS. 5A and 5B are views showing the relationship with respect to reference position signal 444 of recording device drive signal 452 in the recording device drive pulse generating section 450. FIG. 5A shows the case of left reference where image density signal is caused to be in correspondence with start of scanning time with respect to scanning time corresponding to one pixel, and FIG. 5B shows the case of right reference where image density signal is caused to be in correspondence with end of scanning time. By suitably setting reference position signal 444 generated on the basis of phase quantity 432, it is possible to generate recording device drive signal 452 at either one of these reference positions.

Figure 6:
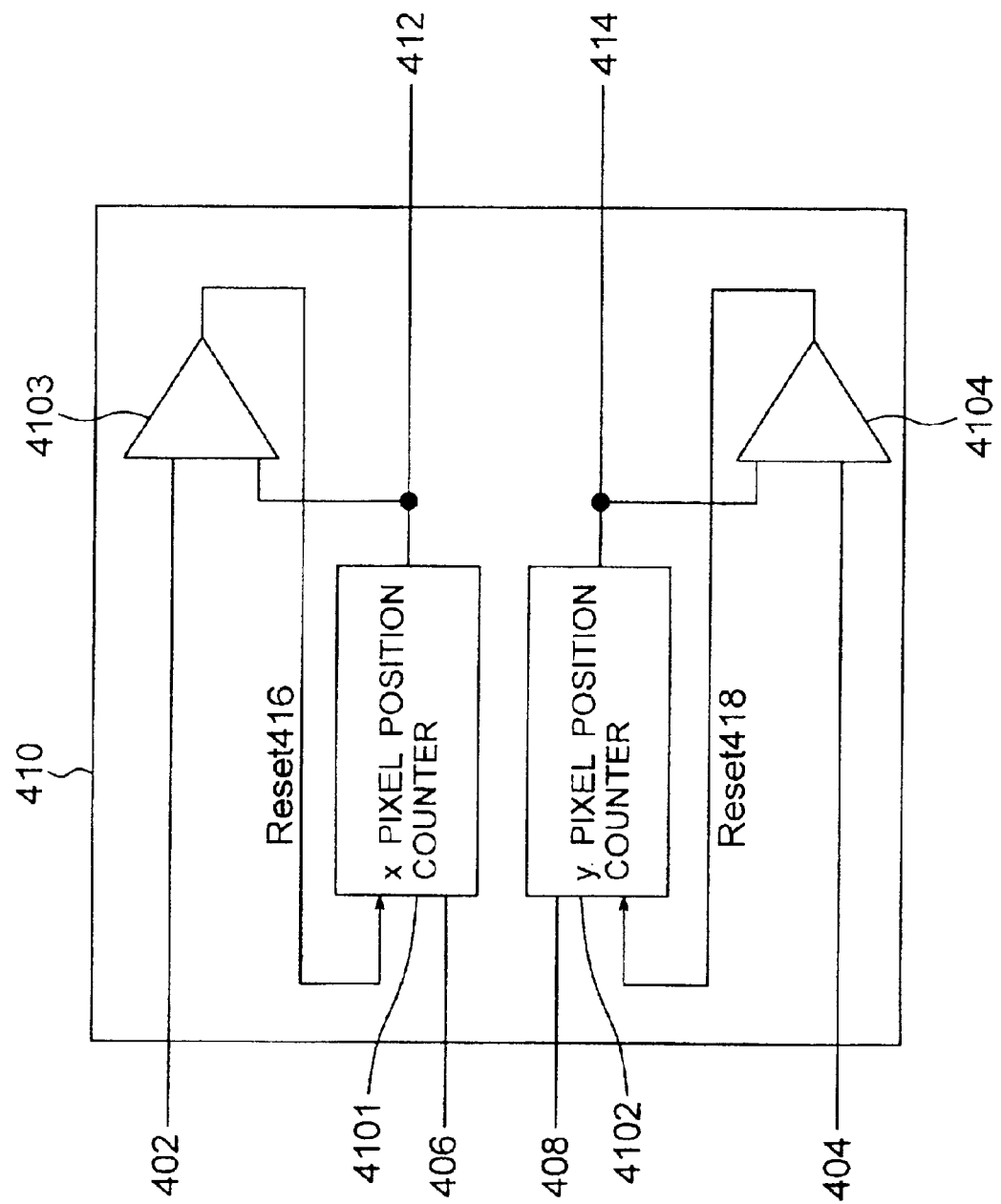
FIG. 6 is a block diagram showing an example of the configuration of the pixel position judging section in FIG. 4.

The configuration of the intrablock pixel position judging section 410 is shown in FIG. 6.

The pixel position judging section 410 is composed of an x pixel position counter 4101, a y pixel position counter 4102, and comparators 4103 and 4104.

The x pixel position counter 4101 is synchronous reset counter which counts up by xclock 406 to output its value as coordinate x412 of the main scanning direction. In the case where it is judged at the comparator 4103 that register setting signal xreg 402 and coordinate x412 of the main scanning direction are in correspondence with each other, Reset signal 416 is generated. Thus, count up value is reset. Namely, the x pixel position counter 4101 is counter for counting up from 0 to value of xreg 402.

Similarly, the y pixel position counter 4102 is synchronous reset counter which counts up by yclock 408 to output its value as coordinate y414 of the sub scanning direction. In the case where it is judged at the comparator 4104 that register setting signal yreg 404 and coordinate y414 of the sub scanning direction are in correspondence with each other, Reset signal 418 is generated. Thus, count up value is reset. Namely, they pixel position counter 4102 is counter for counting up from 0 to value of yreg 404.

Figure 7:
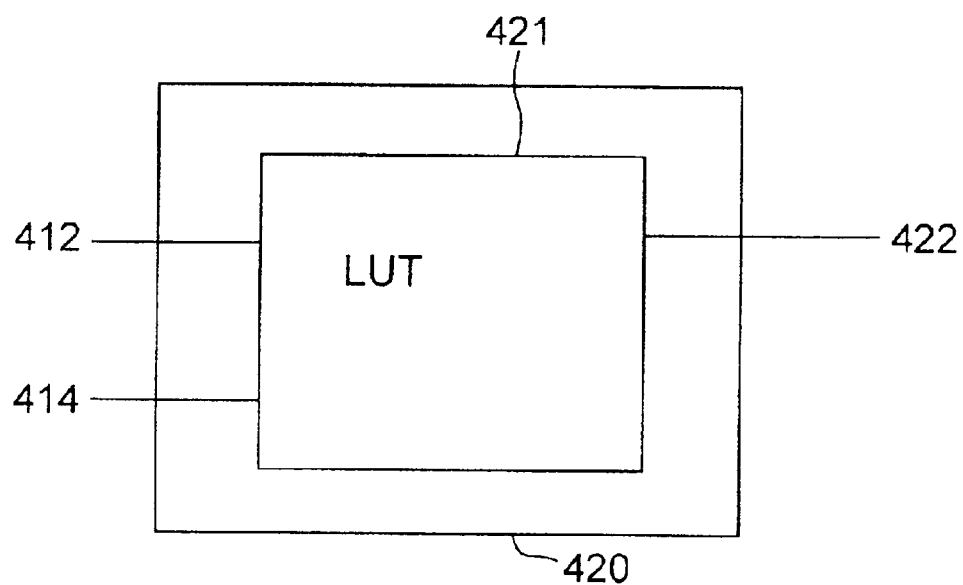
FIG. 7 is a view showing an example of the configuration of the shifted pixel designating section in FIG. 4.

FIG. 7 shows the configuration of the shifted pixel designating section 420. This shifted pixel designating section 420 is comprised of look-up table LUT 421, and serves to input coordinate x412 of the main scanning direction and coordinate y414 of the sub scanning direction to generate shifted pixel designation signal 422.

Figure 8:
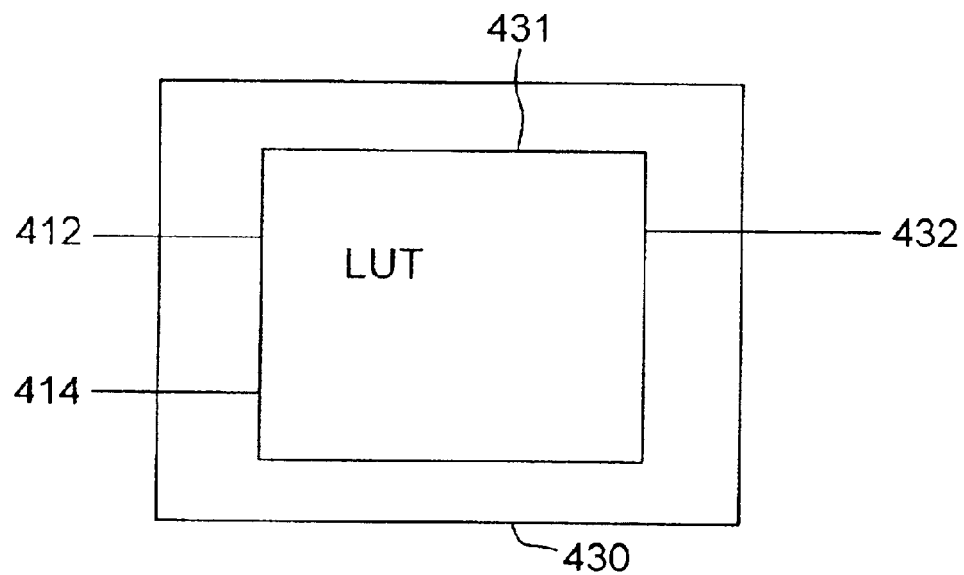
FIG. 8 is a view showing an example of the configuration of the phase calculating section in FIG. 4.

FIG. 8 shows the configuration of the phase calculating section 430. This phase calculating section 430 is comprised of look-up table LUT 431, and serves to input coordinate x412 of the main scanning direction and coordinate y414 of the sub scanning direction to output phase quantity 432.

Figure 9:
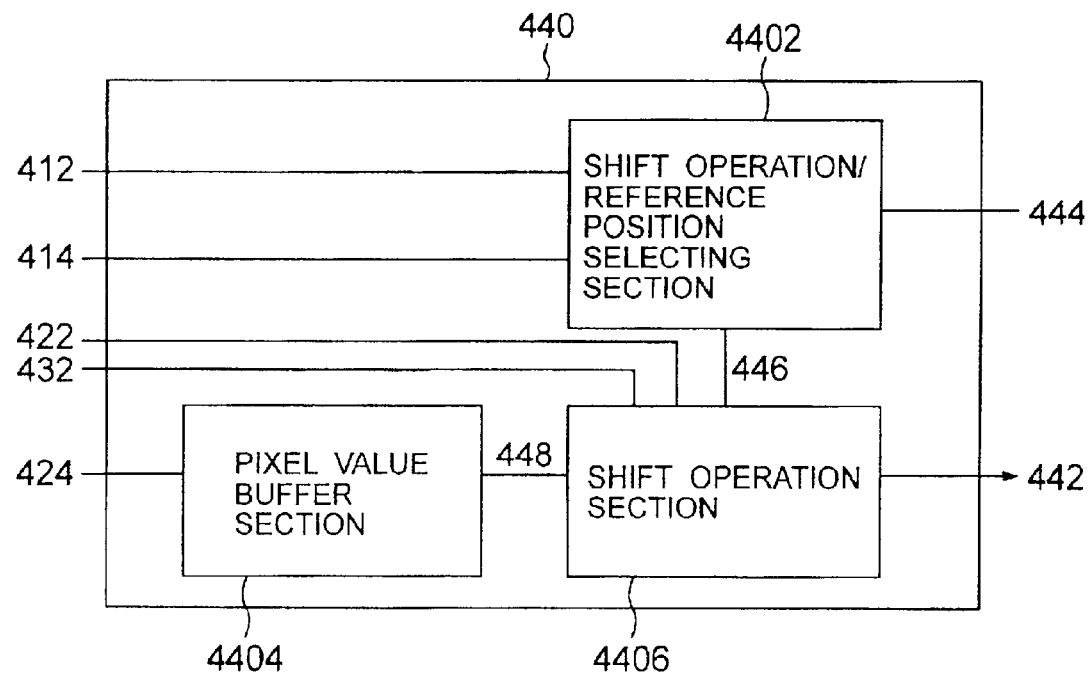
FIG. 9 is a view showing an example of the configuration of the pixel value shift section in FIG. 4.

FIG. 9 is a block diagram showing the configuration of the pixel value shift section 440. This pixel value shift section 440 includes a shift operation/reference position selecting section 4402, a pixel value buffer section 4404 and a shift operation section 4406.

The shift operation/reference position selecting section 4402 is comprised of look-up table LUT (not shown), and allows coordinate x412 of the main scanning direction and coordinate y414 of the sub scanning direction to be address to output reference position signal 444 and shift operation select signal 446.

The shift operation section 4406 inputs shift operation select signal 446, peripheral pixel data 448 obtained by buffering processing pixel input value data 424 at the pixel value buffer 4404, shifted pixel designation signal 422 outputted from the shifted pixel designating section 420 and phase quantity 432 outputted from the phase calculating section 430 to output output value 442 of processing pixel which is the result that shift operation has been made.

Figure 10:
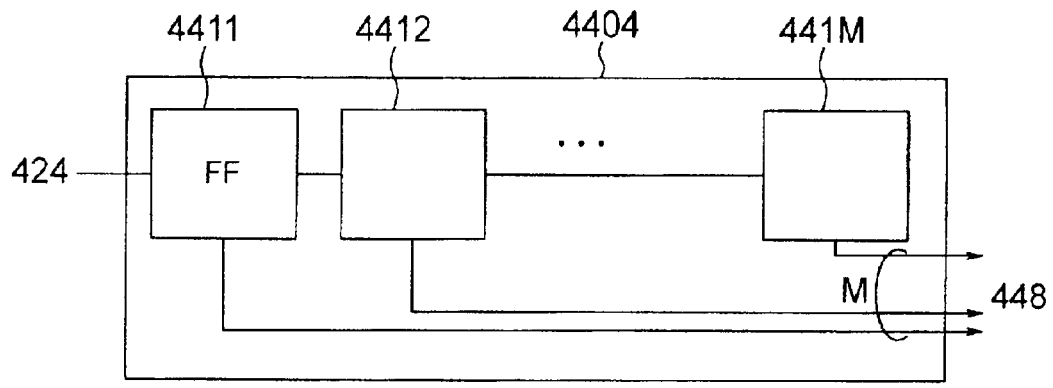
FIG. 10 is a view showing an example of the configuration of the pixel value shift section in FIG. 4.

FIG. 10 is a block diagram showing the configuration of the peripheral pixel value buffer section 4404. The peripheral pixel value buffer section 4404 buffers processing pixel data 424 successively sent by M number of flip-flops 4411 to 441M to output respective buffered values as M number of peripheral pixel data 448.

The generating processing method for stripe pattern screen executed in the apparatus of this invention will now be described.

Explanation will be given in connection with the method called three pixel modulation in which pixel values corresponding to three pixels arranged in the main scanning direction are collected at one portion as stripe pattern screen.

Figure 11:
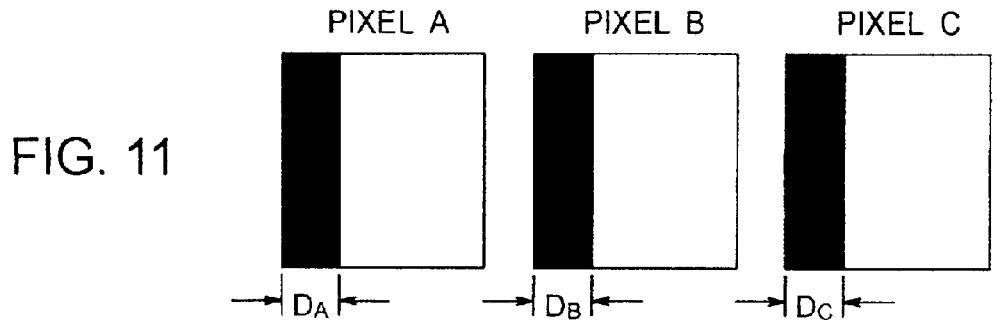
FIG. 11 is an explanatory view showing pixel value distribution of three pixels A, B and C arranged in the main scanning direction in unprocessed state.

FIG. 11 shows pixel value distribution in unprocessed state. There are three pixels A, B and C arranged in the main scanning direction, and respectively have pixel values (pulse widths) of $D_A$, $D_B$, $D_C$.

Figure 12:
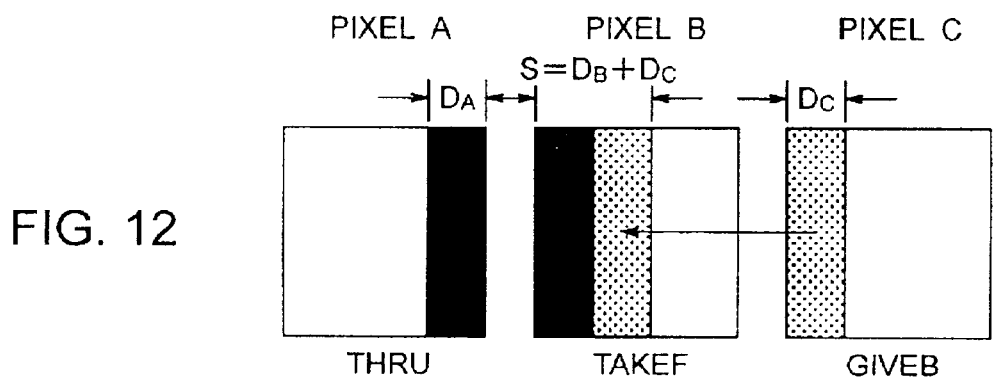
FIG. 12 is an explanatory view showing conventional processing result;.

FIG. 12 shows the conventional processing result. Left pixel A which has undergone processing has pixel value $D_A$ as it is, and the pulse recording reference position is set at the right side. The operation processing to output pixel value as it is in the left pixel A in a manner stated above is called THRU.

At the central pixel B, pixel value DC of the right pixel C is received to record sum S ($=D_B+D_C$) of pixel value $D_B$ of the central pixel and pixel value $D_C$ of the right pixel. The recording reference position in this instance is set at the left side. Operation processing to add density data of pixel of the right side in the central pixel B in a manner stated above is called TAKEF.

Further, at the right pixel C, recording is not carried out because pixel value $D_C$ is delivered to the central pixel B. When pixel value $D_B$ of the central pixel B has pulse width close to that of full dots so that $D_C$ cannot be completely shifted, there is the case where right pixel C is also recorded., At this time, the reference position is set at the left side. The operation processing to add pixel density signal subject to shift operation to pixel value adjacent at the left in the right pixel C in a manner stated above is called GIVEF.

Figure 24:
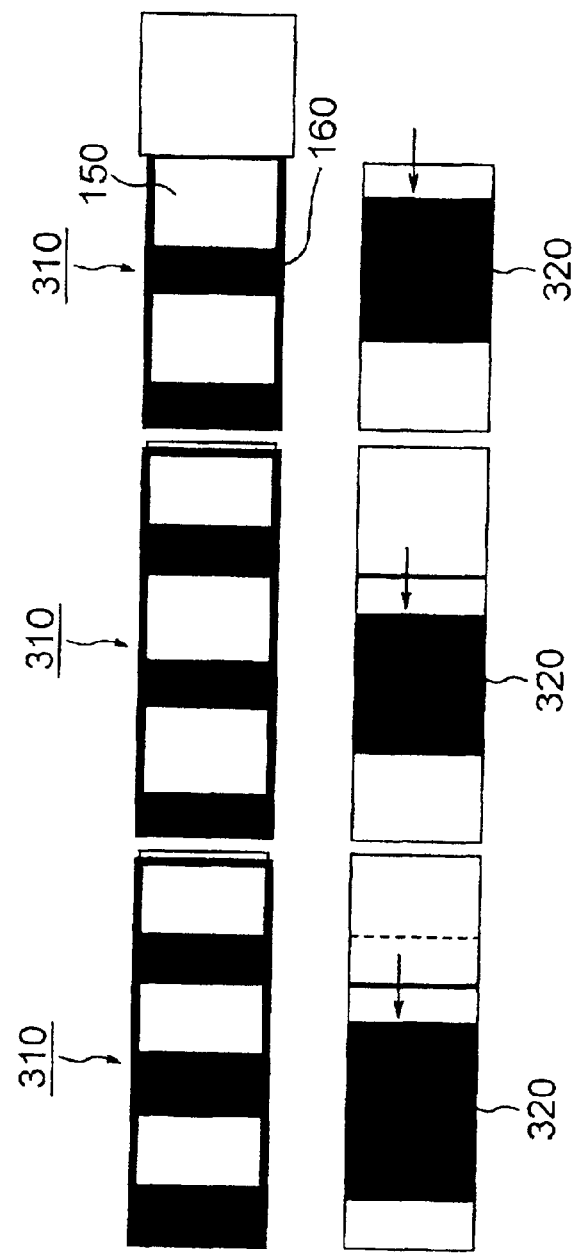
FIG. 24 is a view showing a conventional method of generating stripe pattern by pixel value shift.
Figure 25:
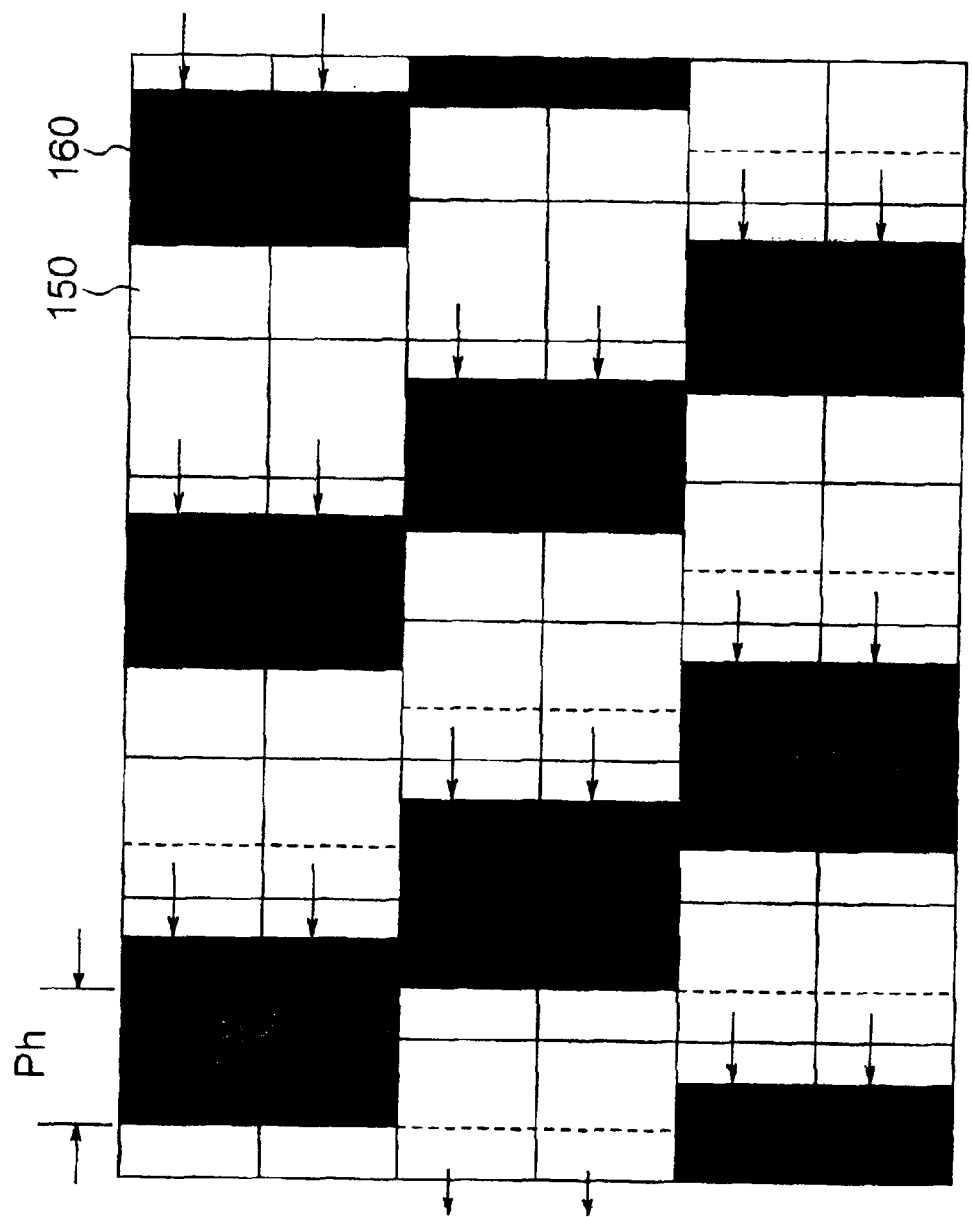
FIG. 25 is a view showing the problem of the conventional method of generating stripe pattern by pixel value shift.
Figure 26:
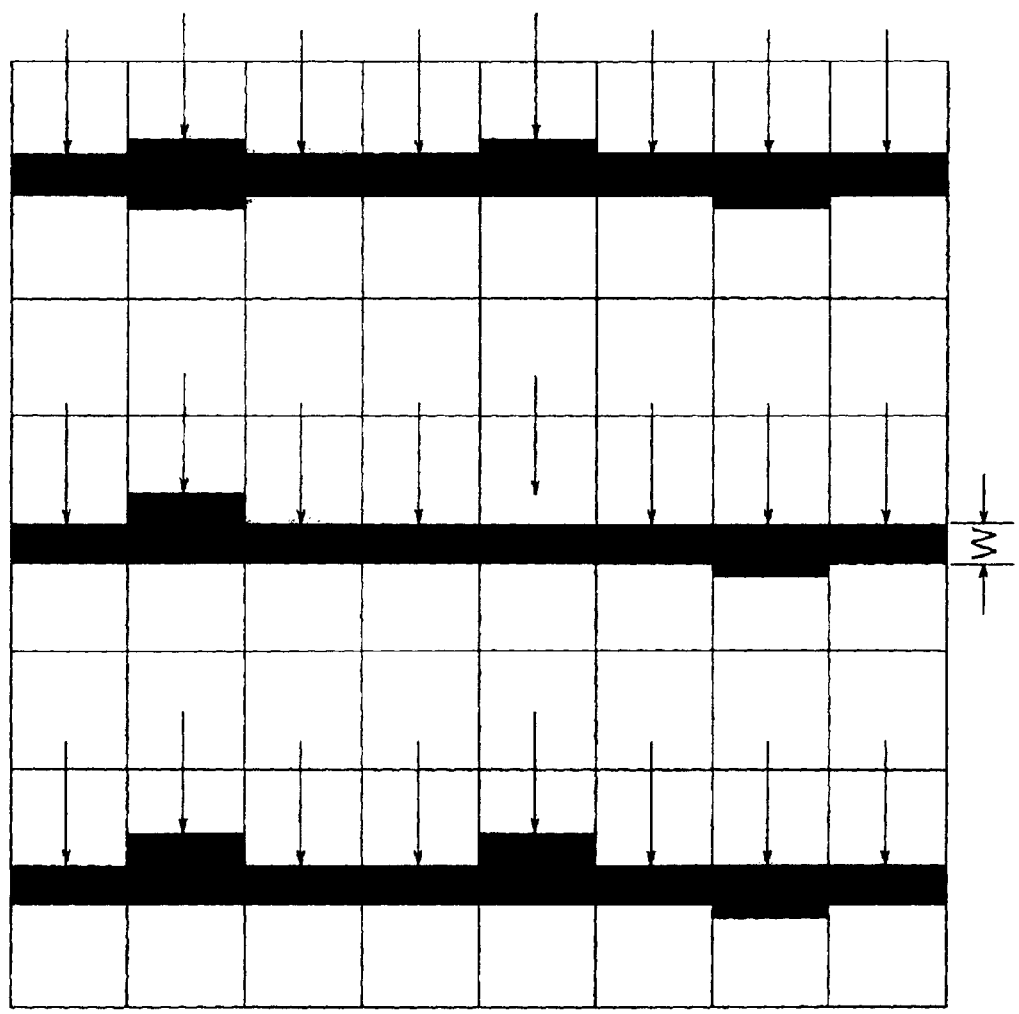
FIG. 26 is a view showing prior art for generating fine stripe pattern at highlight portion.
Figure 27:
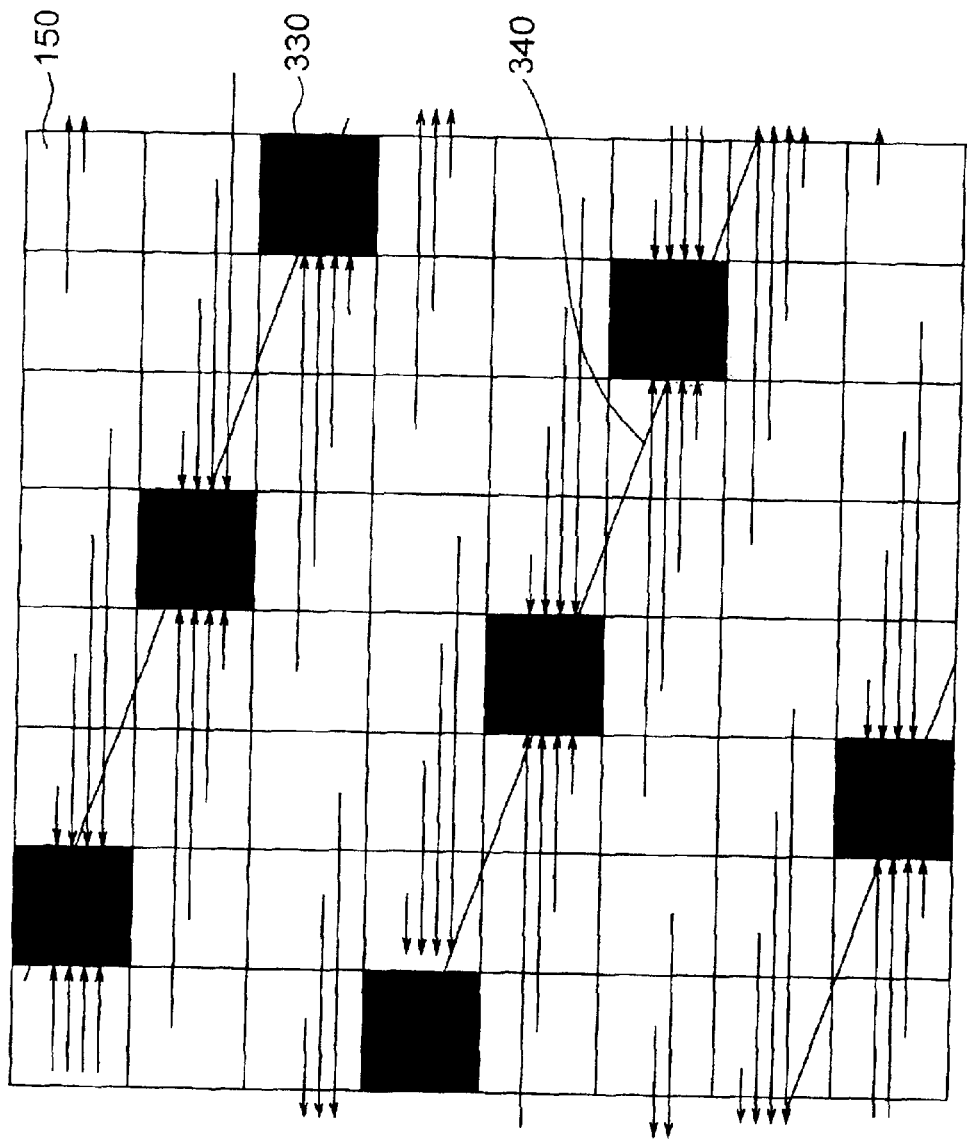
FIG. 27 is a view showing prior art for collecting pixels into block larger than stripe pattern at highlight portion.
Figure 28:
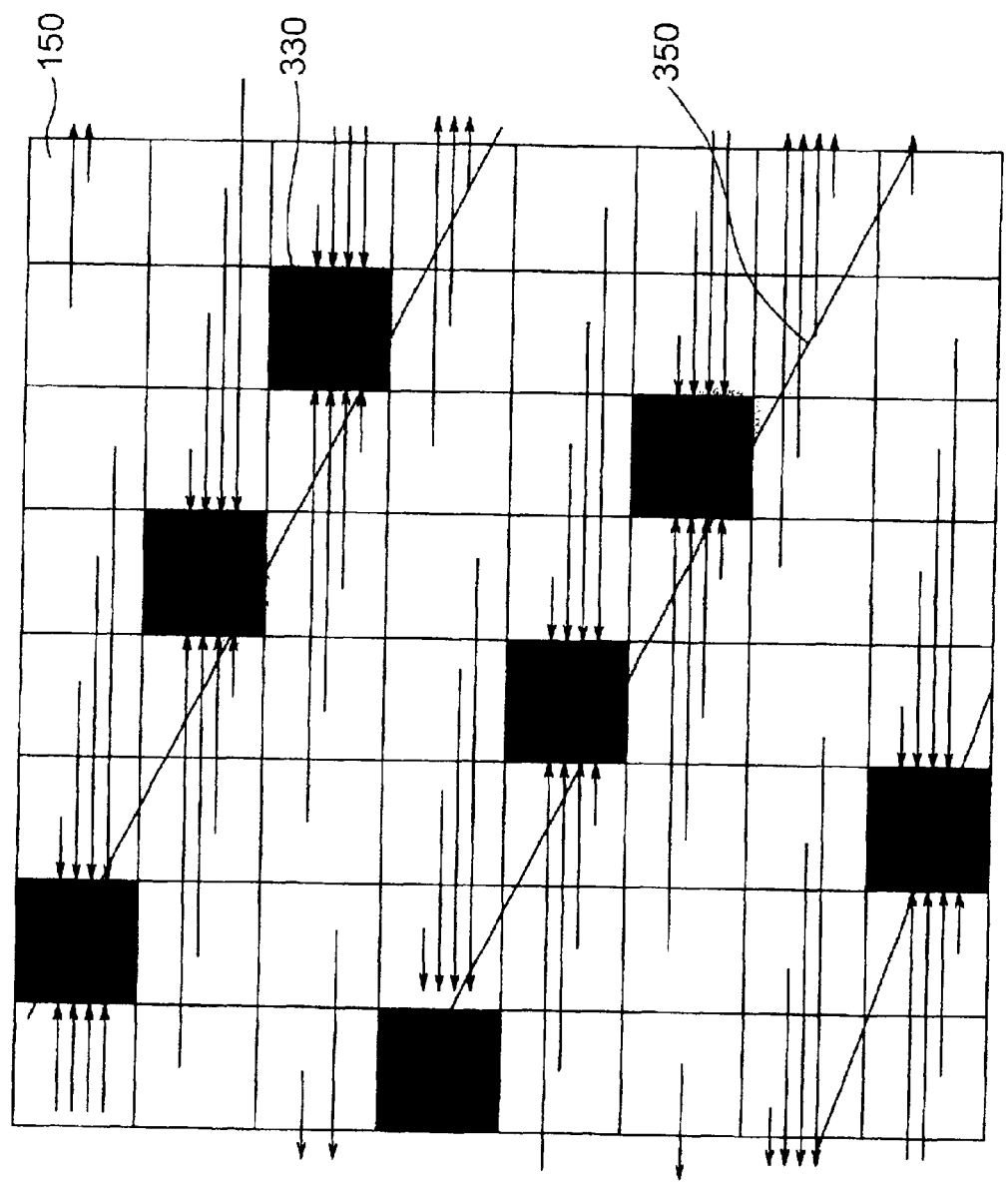
FIG. 28 is a view showing the problem of the prior art for collecting pixels into block larger than stripe pattern at highlight portion.

Such processing are carried out with respect to three pixels arranged in the main scanning direction as shown in FIG. 24 to further shift phases of respective operations every sub scanning lines. Thus, stripe pattern having screen angle as shown in FIG. 28 can be generated. However, as previously described, with this method, there is the problem that it is impossible to generate smooth stripe pattern having screen angle.

Figure 13A:
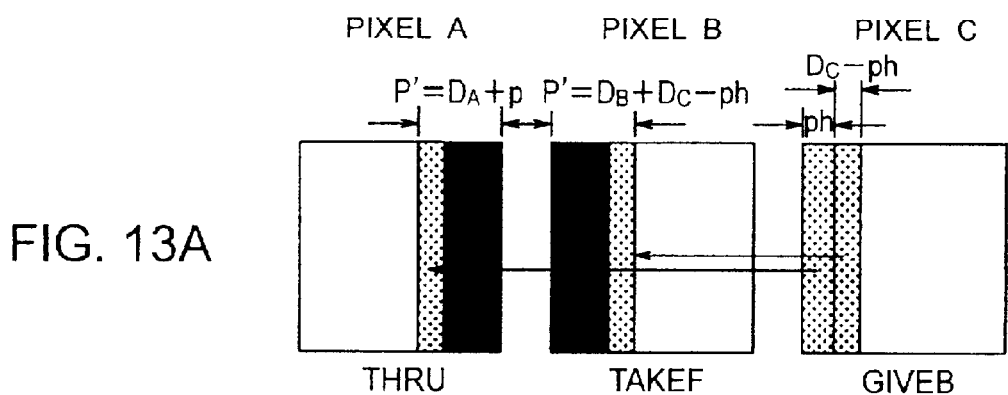
FIGS. 13A and 13B are explanatory views showing processing result according to this invention.
Figure 13B:
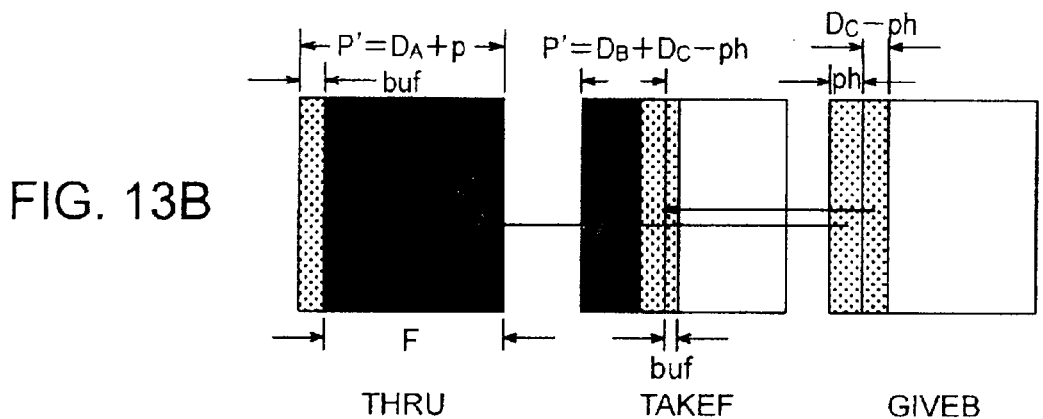

For this reason, in the image processing apparatus according to this invention, processing in which pixel of shift destination is caused to be 2 pixels is carried out as shown in FIGS. 13A and 13B. Namely, in accordance with this processing, pixel value of right pixel C is shifted with respect to two pixels of left pixel A and central pixel B. In more detail, in the stripe pattern screen processing of three pixel modulation, processing is carried out in three pixel units arranged in the main scanning direction, and right pixel A and central pixel B are automatically caused to be shift pixels. For this reason, operation processing selection such as THRU, etc. is caused to also double as shift pixel designation, and shift pixel designation signal 422 from the shifted pixel designation section 420 is not utilized. However, at the time of collecting many pixel values to constitute dot pattern as shown in FIG. 28, shift pixel designation signal 422 is required.

FIG. 13A shows the case where left pixel A has margin with respect to full dots, and pixel value $D_C$ shifted in the right pixel C is divided into phase quantity ph and DC–ph. In this case, ph indicates positional shift quantity from position of the ideal stripe pattern. At the left pixel A, ph is shifted, and pixel value of processed pixel A becomes equal to $P=D_A+ph$. At the central pixel B, the remaining $D_C$–ph is shifted. Thus, pixel value of processed pixel B becomes equal to $P=D_B+D_C-ph$.

FIG. 13B shows the case where value P of shifted pixel A is above value F of full dots. In this case, the pixel value of the left pixel A is expressed as P=F, and buf=$D_A$+ph–F which exceeds is added to pixel B for a second time. For this reason, at the central pixel B, the final pixel quantity is expressed as $D_B+D_C-ph+D_A+ph-F=D_A+D_B+D_C-F$.

As stated above, there is necessity of carrying out special operation in dependency upon pixel values $D_A$, $D_B$, $D_C$ and value of phase quantity ph, and the detail of that example is shown in Table 1 of FIG. 14.

The processing in this Table is slightly different from the processing which has been described with reference to FIGS. 13A and 13B. It is indicated that when pixel value of remarked pixel is P, pixel value adjacent at the right is Pf1, pixel value further adjacent at the right is Pf2, phase quantity is ph and full dot pixel value of one pixel is xff, pixel values 462, 464, 466 of processing pixels in respective operation circuits and write shift buffer values 472, 474, 476 given from respective operation circuits to shift value buffer section 4430 via select section 4428 are outputted in accordance with classification of the conditional column as described later. It is to be noted that it is understood that, as indicated by the conditional column of FIG. 14, even when ph has negative value, similar processing can be carried out.

As described above, by controlling shift quantity to pixels A, B of pixel value $D_C$ in dependency upon phase quantity ph, it is possible to control center of gravity position of the stripe pattern.

Figure 15:
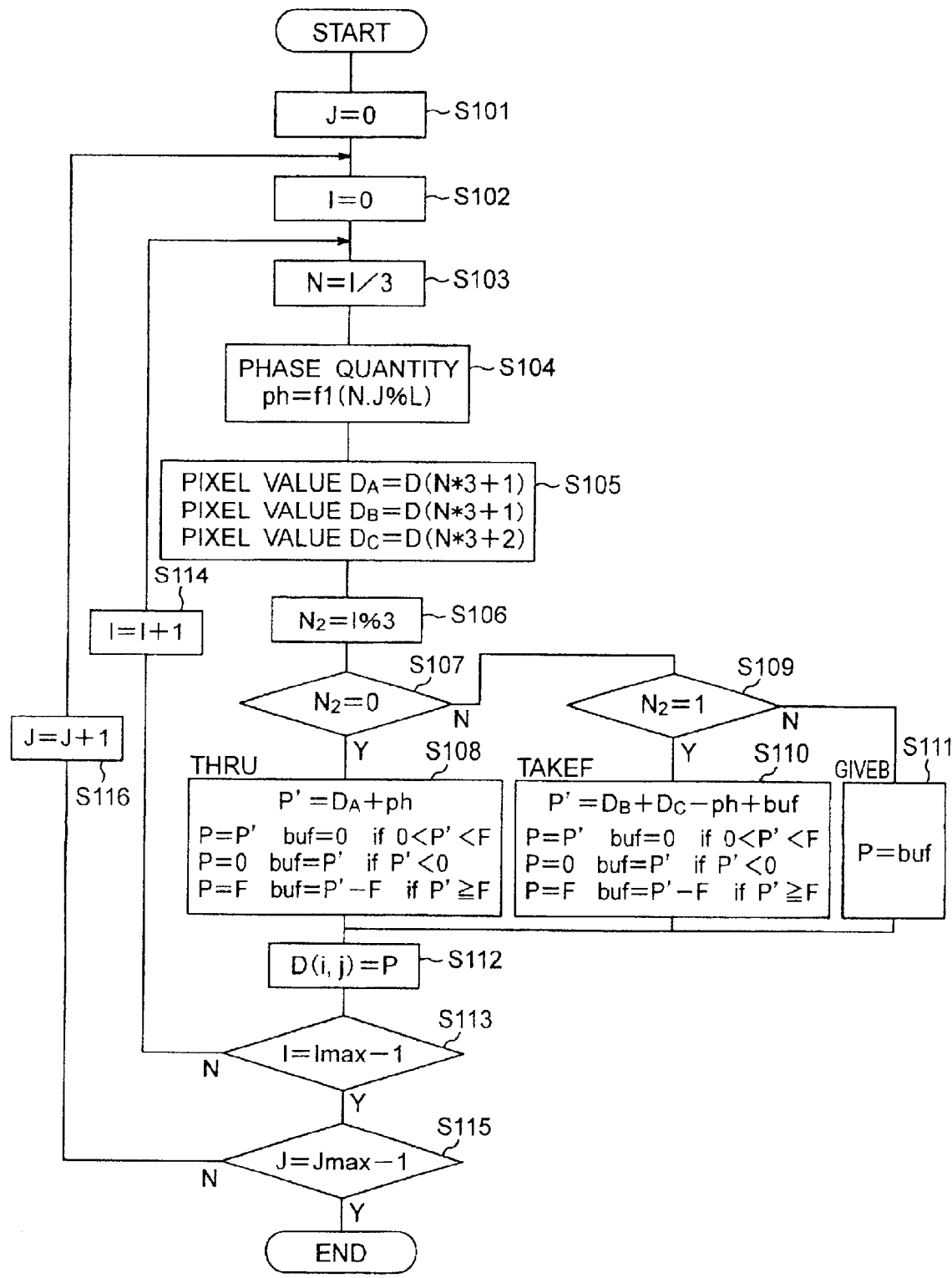
FIG. 15 is a flowchart showing the contents of stripe pattern screen generation processing by three pixel modulation according to this invention.

The flowchart for the above-mentioned stripe pattern screen generation processing by three pixel modulation is shown in FIG. 15.

Initially, with respect to pixel position (I, J), J=0 (step S101) and I=0 (step S102) are caused to be set. Namely, pixel position is set to initial position. Moreover, because of three pixel modulation, one (1) block size is 3 and processing position N in the main scanning direction is defined as N=1/3 (step S103).

Then, phase quantity ph is determined in dependency upon respective block positions (N, J) with respect to pixel value D (I, J) which has been sent (step S104). This determination is carried out at the phase calculating section 430.

Then, at step S105, respective pixels within block (pixel value $D_A$ of left pixel A, pixel value $D_B$ of central pixel B and pixel value $D_C$ of right pixel C) are caused to undergo buffering. Such buffering is carried out by pixel value buffer section 4404.

At step S106, select signal N2 for switching image operation processing in accordance with processing position N of the main scanning direction within block is generated. This is carried out by the shift operation/reference position selecting section 4402.

Since corresponding pixel is left pixel A when N2 is equal to 0 (zero) (step S107), THRU processing is carried out (step S108). Since corresponding pixel is central pixel B when N2 is equal to 1 (one) (step S109), TAKEF processing is carried out (step S110). Since corresponding pixel is right pixel C when N2 is not both 0 and 1 (step S109), GIVEB processing is carried out (step S111). The processing in the respective operation sections referred to here are similar to those which have been explained with reference to FIGS. 13A and 13B.

Output value of processing pixel is obtained in this way (step S112). At times subsequent thereto, similar processing are carried out by incrementing, one by one, positions until the main scanning direction position reaches the maximum value –1 (steps S113, S114) and by incrementing, one by one, positions until the sub scanning direction position reaches the maximum value –1 every time one main scanning direction processing has been completed (steps S115, S116). Thus, processing at all processing positions are completed.

Figure 16:
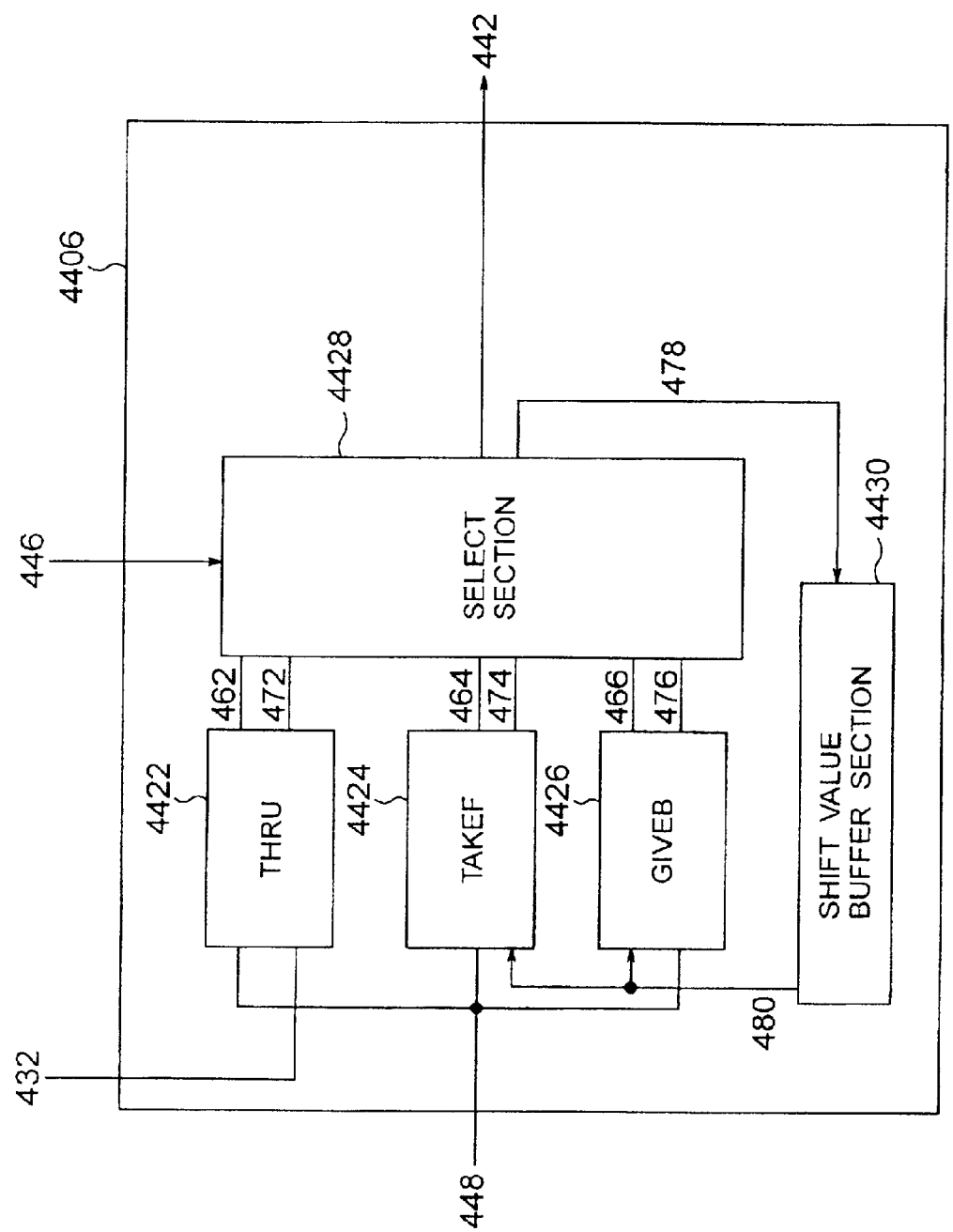
FIG. 16 is a block diagram showing the configuration of shift operation section.
Figure 18:
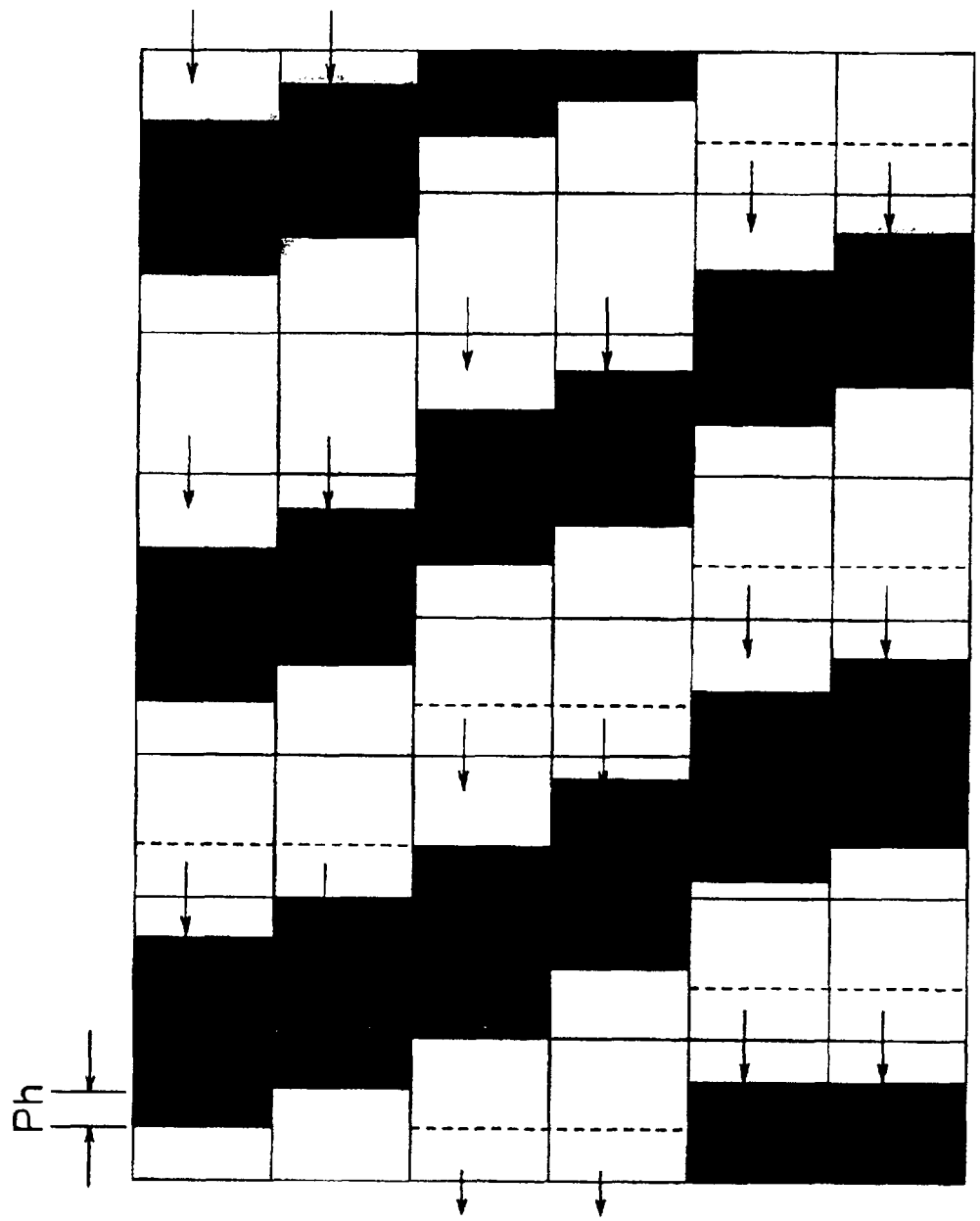
FIG. 18 is an explanatory view for explaining that suitable screen angle can be taken by this invention.
Figure 19:
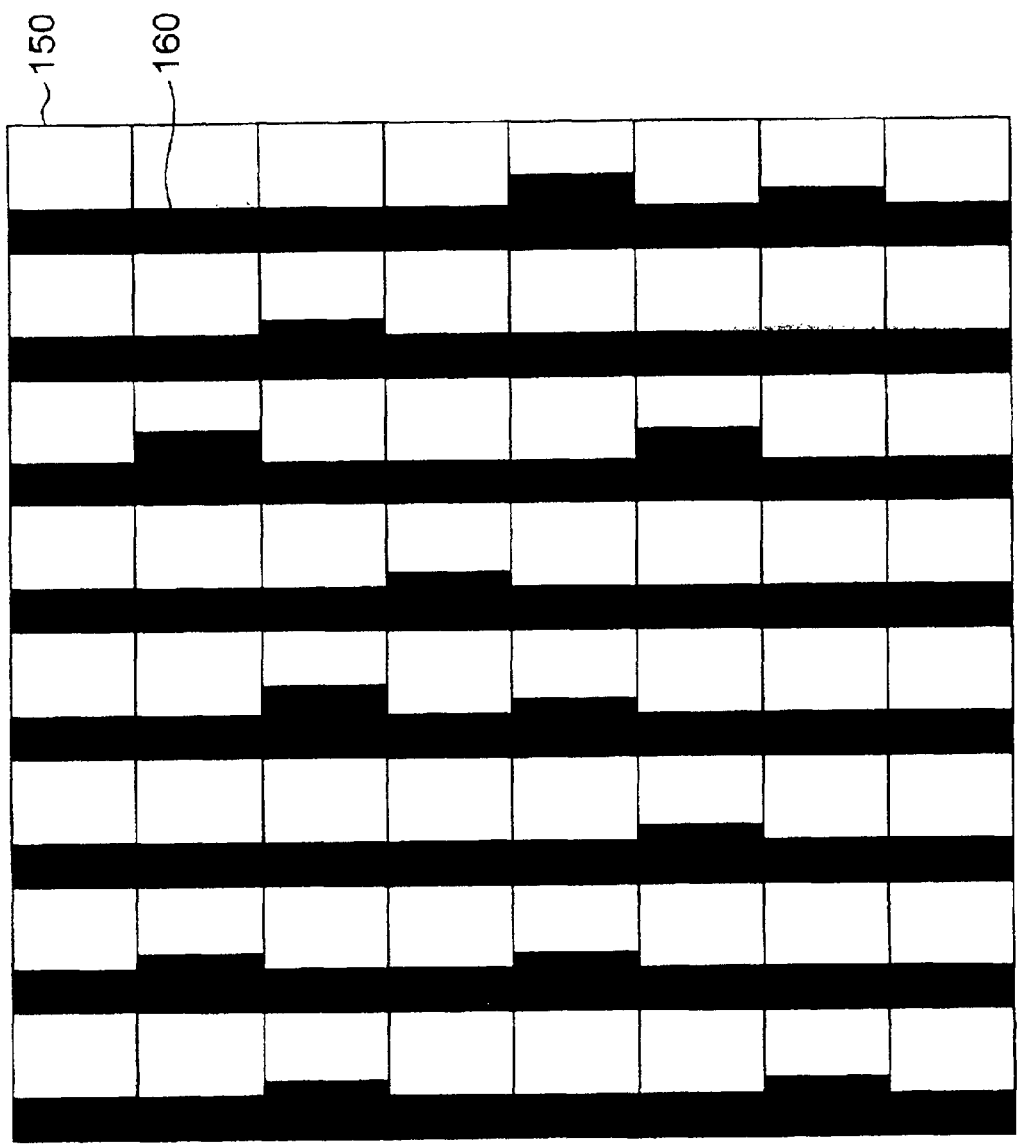
FIG. 19 is an explanatory view of the stripe pattern system.
Figure 20:
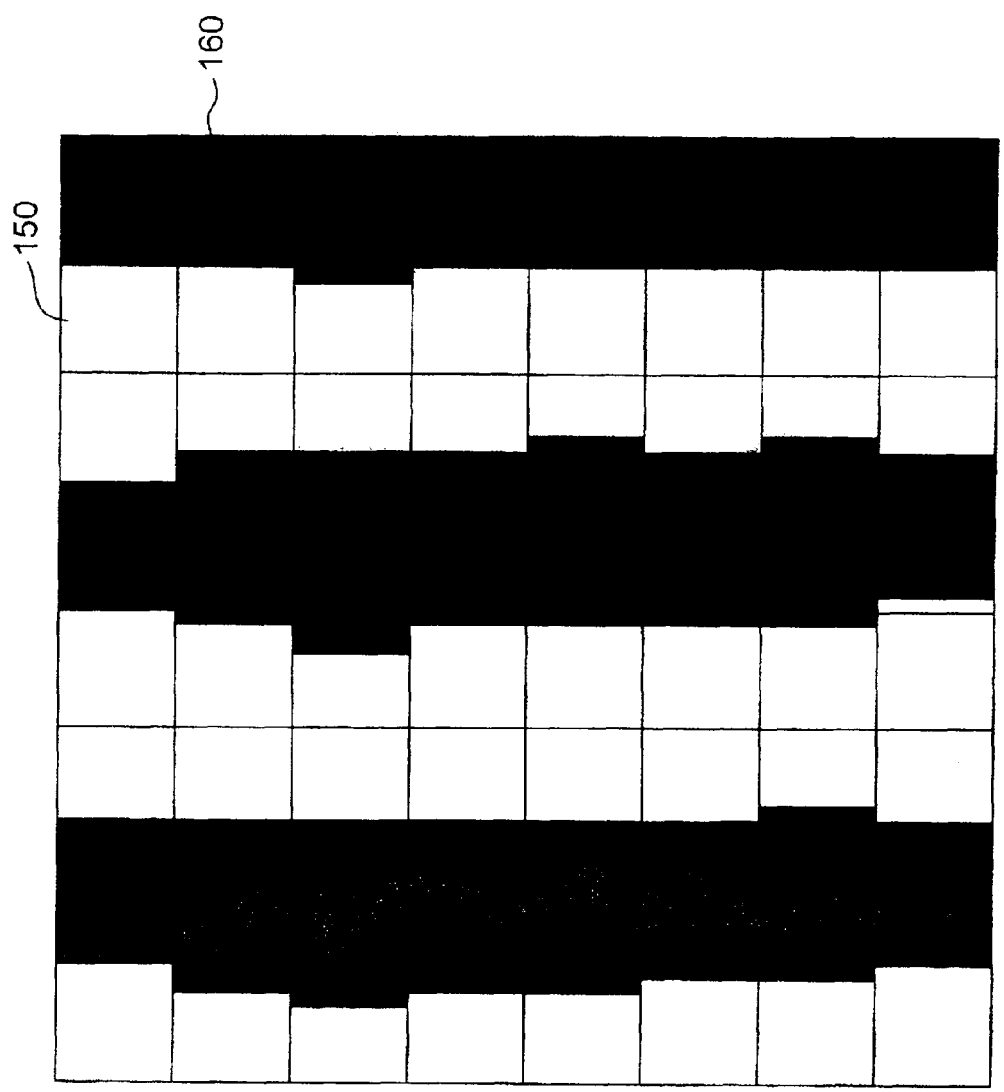
FIG. 20 is an explanatory view showing the example where modulation frequency is lowered in the stripe pattern system.
Figure 21:
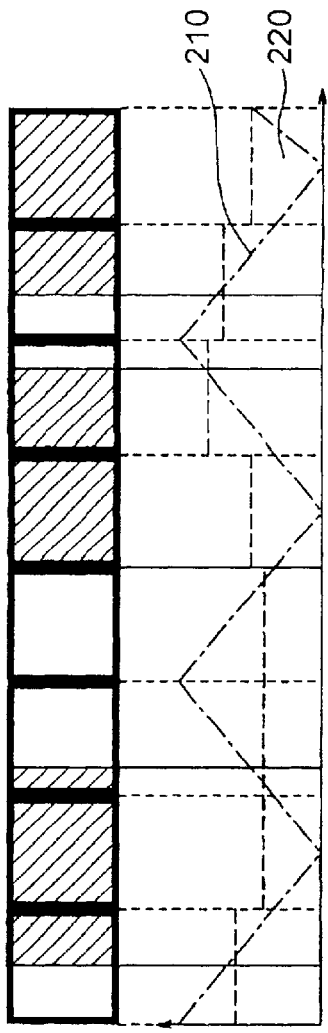
FIG. 21 is a view showing, in a model form, a method of preparing stripe pattern by comparison between reference signal wave and picture signal.
Figure 22A:
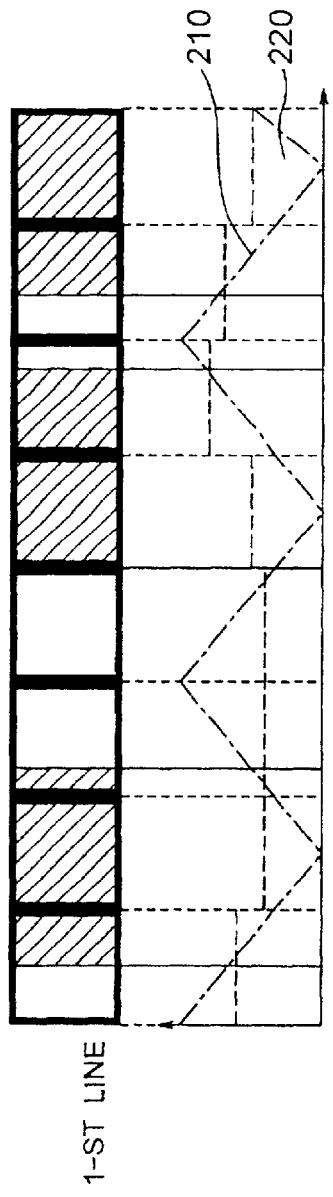
FIGS. 22A and 22B are schematically views showing a method of giving phase difference to take screen angle at stripe pattern.
Figure 22B:
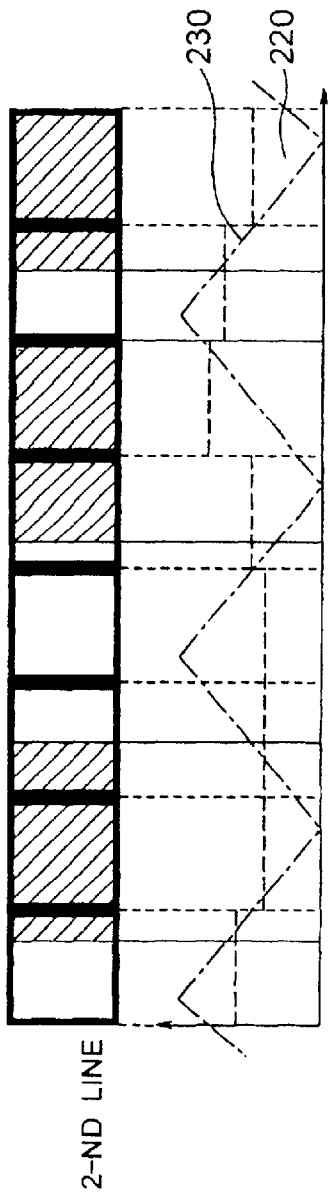
Figure 23:
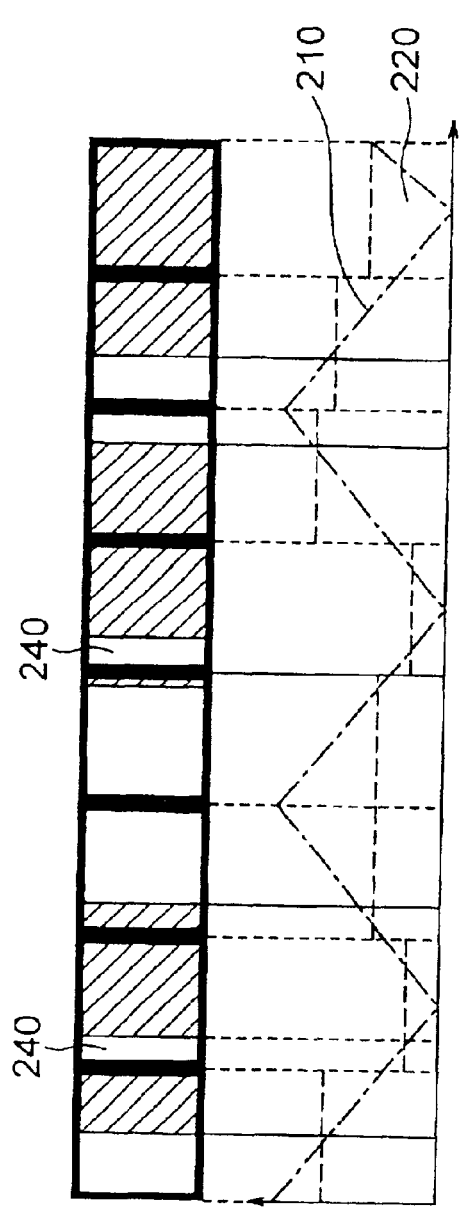
FIG. 23 is a view showing the problem of conventional method of preparing stripe pattern by comparison between reference signal and picture signal.

The configuration of the shift operation section 4406 is shown in FIG. 16.

The shift operation section 4406 includes THRU 4422, TAKEF 4424, GIVEB 4426 which are shift operation circuits which carry out three different shift operations, and includes a select section 4428 for selecting either one of these outputs and a shift value buffer section 4430.

The operation circuits THRU 4422, TAKEF 4424, GIVEB 4426 are supplied with peripheral pixel data 448 which are data of left pixel A, central pixel B and right pixel C within a certain block. Thus, from the respective operation circuits, output values 462, 464, 466 and shift buffer values 472, 474, 476 are respectively outputted. These values are delivered to the select section 4428. Thus, either one of them is selected by shift select signal 446 outputted from the shift operation/reference position select section 4402. Output values of the respective operation circuits are outputted as output value 442 of pixel to be processed, and shift buffer value is written into shift value buffer section 4430 as select shift buffer value 478 and is read out therefrom. It is fed back to operation circuits TAKEF 4424 and GIVEB 4426 as shift buffer value 480. Such shift buffer value buf is expressed as buf=$D_A$+ph–F shown in FIG. 13B.

As described above, in accordance with the image processing apparatus according to this invention, it is possible to form stripe pattern in which pixel quantity is shifted in accordance with phase quantity as shown in FIGS. 13A and 13B.

On the contrary, in the conventional image processing apparatus, as shown in the Table of FIG. 17, in the operation circuits of THRU, TAKEF and GIVEB, since phase difference ph every line for taking screen angle at stripe pattern as shown in FIG. 17 is not entirely taken into consideration, control can be carried out only in one pixel units. In this respect, in the operation of this invention shown in FIG. 14, since distribution of pixel quantity is carried out in consideration of phase quantity, it is possible to control shift operation of screen angle in units smaller than one pixel.

As a result, phase difference ph can be smaller than one pixel. Thus, smooth stripe pattern having screen angle can be formed.

As described above, in accordance with this invention, such an approach is employed to determine phase quantity every pixel value block to control value of pixel shifted to shifted pixel designated within block from respective pixels within block in dependency upon phase quantity thereof to thereby prepare dot cluster within block by pixel value shift, thereby making it possible to control position within block of dot cluster with that block by level smaller than pixel size at the time of constituting stripe pattern or texture of dots by set of dot clusters within the respective blocks. For example, in the case where cluster of dots is prepared in a manner bridging over adjacent two pixels, when a portion of one pixel is shifted to the other, i.e., shifted pixel, central position of cluster of dots is shifted (moved) to the side of shifted pixel. By controlling its shift quantity in dependency upon phase quantity, it is possible to adjust distortion of contour of the stripe pattern or unevenness of distribution of dots.

In addition, while the case where two pixels are adjacent within block as shifted pixel has been described in the above-described embodiment, pixels of which number is more than 2 can be designated as shifted pixels. By controlling shift quantity to those plural shifted pixels, it is possible to control position of dot cluster constituted on the shifted pixels with accuracy less than pixel size.

What is claimed is:

1. An image processing apparatus comprising:

an intrablock pixel position judging section for judging pixel position within a block in which pixels constituting image are divided in units of plural pixels;

a shifted pixel designating section for designating shifted pixel to be shifted in accordance with the pixel position judged by the intrablock pixel position judging section;

a phase calculating section for determining phase quantity of intrablock dot cluster for every block; and a pixel value shift section for carrying out shift from respective pixels within the block to the shifted pixel on the basis of the phase quantity determined by the phase calculating section and, value differences of respective pixels within the block and value of the shifted pixel, the pixel value shift section comprising:

a shift operation/reference position selecting section for generating a reference position signal and a shift operation select signal from coordinate of main scanning direction and coordinate of sub scanning direction within the block; and a shift operation section for carrying out shift operation from pixel data and phase quantity supplied to an operation circuit, which is selected by the shift operation select signal.

2. An image processing apparatus comprising:

an intrablock pixel position judging section for judging pixel position within a block in which pixels constituting image are divided in units of plural pixels;

a shifted pixel designating section for designating shifted pixel to be shifted in accordance with the pixel position judged by the intrablock pixel position judging section;

a phase calculating section for determining phase quantity of intrablock dot cluster for every block; and a pixel value shift section for carrying out shift from respective pixels within the block to the shifted pixel on the basis of the phase quantity determined by the phase calculating section and, value differences of respective pixels within the block and value of the shifted pixel, wherein the pixel value shift section comprises:

shift quantity judging means for determining distribution of shift quantity to the shifted pixel of respective pixels within the block on the basis of the phase quantity, values of respective pixels within the block and value of the shifted pixel; and a shift operation section for shifting the shift quantity to the shifted pixel.

3. An image processing apparatus as set forth in claim 2, wherein the shift operation section serves to carry out shift operation so as to shift (move), in a distributed manner, pixel quantity of shift pixel with respect to plural different pixels in accordance with the phase quantity.

4. An image processing apparatus as set forth in claim 3, wherein distributing shift (movement) of pixel quantity of shift pixel by the shift operation section is carried out in such a manner that center of gravity position by pixels within block before shift is also maintained after shifting.

5. An image processing apparatus comprising:

an intrablock pixel position judging section for judging pixel position within a block in which pixels constituting image are divided in units of plural pixels;

a shifted pixel designating section for designating shifted pixel to be shifted in accordance with the pixel position judged by the intrablock pixel position judging section;

a phase calculating section for determining phase quantity of intrablock dot cluster for every block; and a pixel value shift section for carrying out shift from respective pixels within the block to the shifted pixel on the basis of the phase quantity determined by the phase calculating section and, value differences of respective pixels within the block and value of the shifted pixel, wherein the shifted pixel designating section determines shift pixel position in such a manner that shifted pixels are disposed in a distributed manner on line having a predetermined angle with respect to the main scanning direction or the sub scanning direction wherein the image processing apparatus serves to process color image, and the shifted pixel designating section determines shift pixel position in such a manner that angles of line on which shifted pixels are disposed in a distributed manner are caused to be different with respect to plural images obtained by carrying out color separation of color image.

* * * * *

UNITED STATES PATENT AND TRADEMARK OFFICE
CERTIFICATE OF CORRECTION

| | | |
|---|---|---|
| PATENT NO. | : 7,054,490 B2 | Page 1 of 1 |
| APPLICATION NO. | : 09/749602 | |
| DATED | : May 30, 2006 | |
| INVENTOR(S) | : Sakaue et al. | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (810) days Delete the phrase "by 810" and insert --by 930 days--

Signed and Sealed this

Sixth Day of October, 2009

David J. Kappos
*Director of the United States Patent and Trademark Office*